US011312333B1

(12) United States Patent
Deyaf et al.

(10) Patent No.: US 11,312,333 B1
(45) Date of Patent: Apr. 26, 2022

(54) EMERGENCY VEHICLE MULTICOLOR LIGHT DEVICE LOCKING SYSTEM

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 17/544,426

(22) Filed: Dec. 7, 2021

(51) Int. Cl.
  *G06Q 30/02* (2012.01)
  *B60R 25/24* (2013.01)
  *B60R 25/104* (2013.01)
  *B60R 25/102* (2013.01)
  *G06Q 10/00* (2012.01)
  *G08B 21/24* (2006.01)
  *B60R 25/10* (2013.01)

(52) U.S. Cl.
  CPC .......... *B60R 25/241* (2013.01); *B60R 25/102* (2013.01); *B60R 25/104* (2013.01); *G06Q 10/20* (2013.01); *G08B 21/24* (2013.01); *B60R 2025/1013* (2013.01); *B60R 2225/00* (2013.01)

(58) Field of Classification Search
  CPC ... B60R 25/241; B60R 25/102; B60R 25/104; B60R 2025/1013; B60R 2225/00; G06Q 10/20; G08B 21/24
  See application file for complete search history.

(56) References Cited

U.S. PATENT DOCUMENTS

| 4,626,966 | A | * | 12/1986 | Bleiwas | B60Q 1/2611 340/471 |
| 5,931,573 | A | * | 8/1999 | Knox | B60Q 1/2611 340/471 |
| RE36,790 | E | * | 7/2000 | Jincks | B60Q 1/2611 359/530 |
| 7,180,252 | B2 | * | 2/2007 | Lys | H05B 45/325 315/312 |
| 2009/0168415 | A1 | * | 7/2009 | Franciscus Deurenberg | H05B 45/20 362/233 |
| 2009/0256697 | A1 | * | 10/2009 | Tallinger | B60Q 1/2692 340/472 |
| 2011/0128729 | A1 | * | 6/2011 | Ng | F21V 7/0008 362/231 |
| 2013/0002153 | A1 | * | 1/2013 | Liu | H05B 45/20 315/185 R |

(Continued)

*Primary Examiner* — Munear T Akki

(57) ABSTRACT

Examples provide a multicolor light device having a plurality of lockable functions, such as color combinations and flash pattern functions. At production, one or more of the available functions are placed in a locked state in which the locked function is inoperable. The dealer or user can obtain an unlock code to unlock one or more light colors and/or flash patterns when desired. Thus, if a user wants the red and blue lights to be operable, the user can obtain one or more unlock codes to unlock the red and/or blue lights in the user-selected flash patterns and color combinations. When unlocked, the selected function operates normally. A data storage device on the multicolor light device stores an assigned UID, a set of available functions associated with the plurality of LED lights, and a lock status of each function in the set of available functions.

20 Claims, 30 Drawing Sheets

(56) References Cited

U.S. PATENT DOCUMENTS

| | | | | |
|---|---|---|---|---|
| 2015/0210209 A1* | 7/2015 | Hulse | ................ | B60Q 1/52 |
| | | | | 362/516 |
| 2019/0392490 A1* | 12/2019 | DeLuca | ............ | G06F 16/9038 |
| 2021/0092815 A1* | 3/2021 | Kanayama | ............ | H05B 45/34 |

* cited by examiner

2100

| User Login | |
|---|---|
| User name | [                    ] |
| Password | [                    ] |

I am an end user that wants to upgrade my product.

| Device Connected Status<br>"connected" |  |
|---|---|
| Lock Status: | Locked |
| Activate: | Additional Color(s) |
| Select option | |
| Serial Number: | XXX |

| Connected Status: Connected | | | |
|---|---|---|---|
| Function | 1A: | Locked | |
| | 1B: | Unlocked | |
| | 2A: | Unlocked | |
| | 3A: | Locked | |
| | 3B: | Locked | |

| Product Info: | Type | Name | Category |
|---|---|---|---|
| UID: | | XXX-XXX-XXX | |
| Production Date: | | 01/01/2021 | |
| History Log: | Date | | Activity |
| | Date | | Activity |
| | Date | | Activity |

Selected Colors:

Red      Blue      Amber      White

Selected Flash Patterns:      A1

| Demo mode | Select to test configuration |
|---|---|
| License Date: | Time period |
| Your cost: | Amount |

Pay Now

Light bar: Connected

Colors: Amber    White    Blue    Red

Pattern:

Try Now

Device must remain connected during demonstration.

Unlock Features

| Single Color | Amount |
|---|---|
| Dual Color | Amount |
| Tri Color | Amount |
| Quad Color | Amount |

Flash Pattern

| | | |
|---|---|---|
| Single Color | Pattern A | Amount |
| Dual Color | Pattern A | Amount |
| | Pattern B | Amount |
| Tri Color | Pattern A | Amount |
| | Pattern B | Amount |
| | Pattern C | Amount |

*FIG. 26*

Your Code is: XXX-XXX

Unlock Now    Click here

*FIG. 27*

EMERGENCY VEHICLE MULTICOLOR LIGHT DEVICE LOCKING SYSTEM

BACKGROUND

A multicolor light device for emergency vehicles is a device including two or more different colored light emitting devices within a single device housing for more color options and flexibility. In one example, a multicolor dual light device is capable of emitting light in two different colors, such as, but not limited to, red and white or various other combinations. A single-color light device, however, is only capable of producing a single-colored light. For example, a single-color light bar can include a lightbar that only lights up in blue or a lightbar that only produces white light. Single color light devices are less expensive and may be preferred by cost conscience customers despite their functional limitations. Typically, a manufacturer or dealer stocks both single-color light devices, as well as multi-color light devices to accommodate all customers. However, it can be inefficient to produce multiple different types of light devices, burdensome to manage multiple different stock keeping units (SKUs) and cost prohibitive for manufacturers and/or dealers to stock large numbers of both single-color and multicolor light devices, resulting in inventory management issues.

SUMMARY

Some examples provide a system and method for emergency vehicle multicolor light devices with lockable functions. A multicolored light device is capable of emitting light in multiple different colors. A single color is unlocked and operable. One or more other colors are locked and inoperable. A data storage device stores a set of available functions including possible combinations of colors and/or flash patterns with a lock status of each function. The multicolored light device communicatively couples with a user device to obtain an unlock code unlocking one or more of the locked functions. When an unlock code is received for a given function, the multicolor light device unlocks that function and changes the lock status of that function from the locked state to an unlocked state. The functions are configurable such that users can customize the light combinations and flash patterns emitted by the multicolor light emitting device.

This Summary is provided to introduce a selection of concepts in a simplified form that are further described below in the Detailed Description. This Summary is not intended to identify key functions or essential functions of the claimed subject matter, nor is it intended to be used as an aid in determining the scope of the claimed subject matter.

BRIEF DESCRIPTION OF THE DRAWINGS

FIG. 21 is an exemplary screenshot illustrating a user login screen.

FIG. 22 is an exemplary screenshot illustrating a device status page.

FIG. 23 is an exemplary screenshot illustrating a device status page showing lock status and history data.

FIG. 24 is an exemplary screenshot illustrating a configuration page.

FIG. 25 is an exemplary screenshot illustrating a demonstration mode page.

FIG. 26 is an exemplary screenshot illustrating a configuration page for unlocking one or more functions on a multicolor light device.

FIG. 27 is an exemplary screenshot illustrating a confirmation page for completing licensing of a locked function on a multicolor light device.

Corresponding reference characters indicate corresponding parts throughout the drawings.

DETAILED DESCRIPTION

Figure 1:
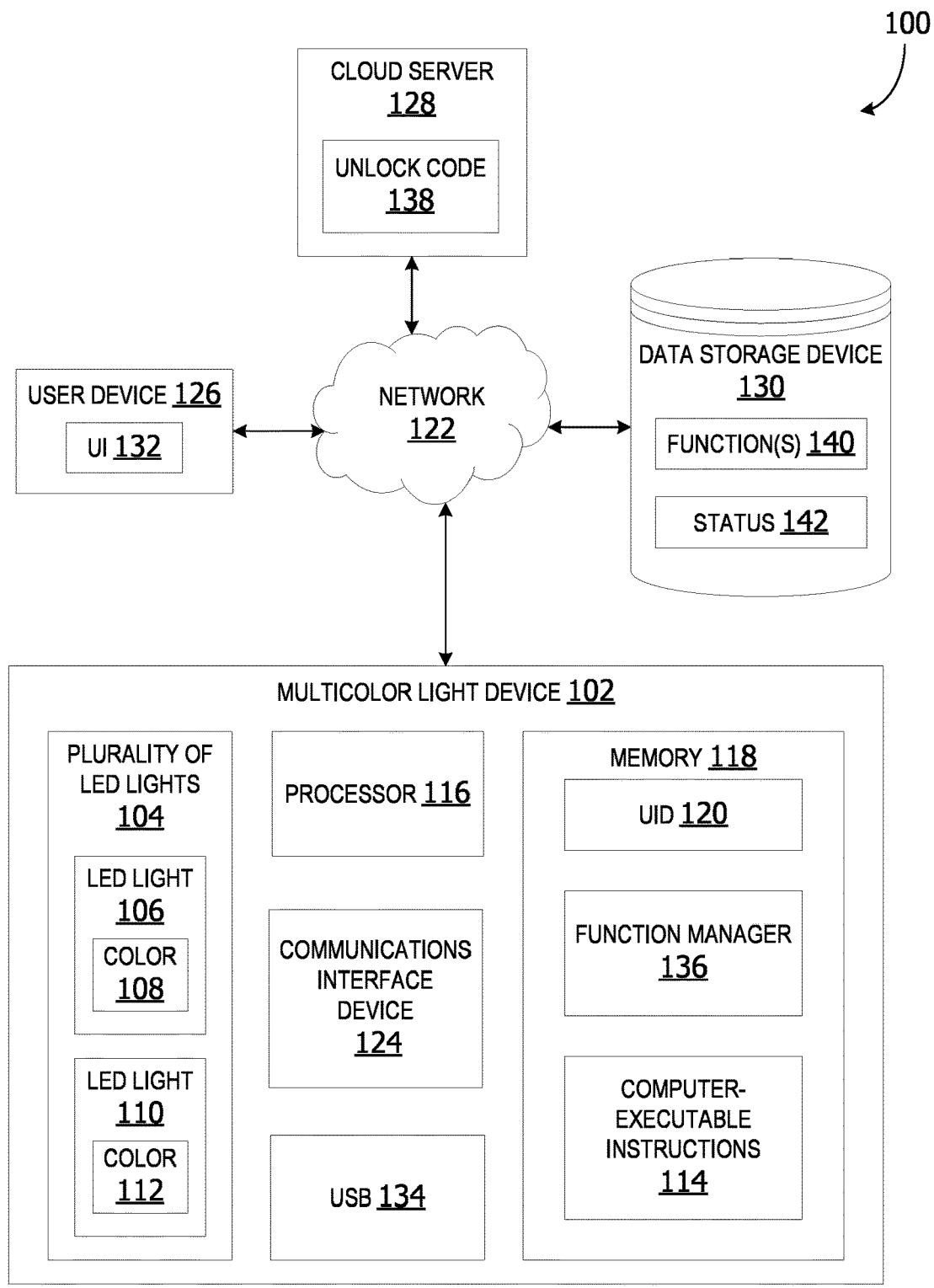
FIG. 1 is an exemplary block diagram illustrating a system for providing lockable functions on a multicolor light device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

There are many different types and varieties of emergency vehicle light devices. Some emergency vehicle light devices are single-color devices, others are dual color, tri-color or quad color. In a single-color light device, all the lights within the device are the same color. The single-color light device is only capable of emitting light in a single color. For example, a single-color light device can be produced with six single color light emitting diode (LED) lights in a light bar device. A quad-color light device can include as many as twenty-four lights producing four different colors. Thus, single-color light device are typically less expensive to produce due to the smaller number of total lights included in each device housing. These single-color light devices are frequently more economical for cost-conscious users. However, single-color devices are significantly more limited in functionality. The multicolor light devices, in some cases, cost twice as much as single-color light devices but provide four times the number of different colored lights and a far greater variety of possible light combinations, flash patterns and flexibility.

Referring to the figures, examples of the disclosure enable a multicolor light device having lockable functions. In some examples, functions such as light colors, combinations of colors and flash patterns on a light device are locked at manufacture time. A user can pick and choose which functions to unlock based on their unique circumstances and budget requirements. This enables users increased flexibility with regard to available functionality of a single light device while improving affordability.

Aspects of the disclosure further enable lockable functions on multicolor light devices, such that one or more colored lights can be locked to enable the multicolor light device to function as a single-color light device. In this manner, a more expensive multicolor light device can be made available to users for the lower cost of a single-color light device. This enables manufacturers and dealers to stock a single type of device while ensuring customers have the maximum range of functionality and customization available. This simplifies inventory requirements by enabling removal of single-color light devices from inventory without reducing sales volume or inconveniencing customers preferring more economical single-color light functions.

In still other examples, a user can lock and unlock functions on the multicolor light device to suit the user's changing circumstances. For example, if a user initially purchases the device with a single-color unlocked and later wants to expand functionality to include additional colors, the user can reconfigure the device to unlock the additional colors and/or flash patterns as desired. This enables improved flexibility and additional user control over device functions.

The multicolor light device operates in an unconventional manner by utilizing one or more software component to enable configurable functionality by providing lockable functions on the light device which can be unlocked by the dealer or end-user after purchase. In this manner, the multicolor light device is used in an unconventional way by locking functions to reduce initial device purchase costs for consumers while enabling the flexibility of unlocking additional functions via licensing to obtain unlock code(s) as desired by the consumer.

Referring again to FIG. 1, an exemplary block diagram illustrates a system 100 for providing lockable functions on a multicolor light device 102. In the example of FIG. 1, the multicolor light device 102 is a device capable of emitting light in a plurality of colors and a plurality of flash patterns. The multicolor light device 102 is a light device capable of being attached or installed on an emergency vehicle, such as, but not limited to, an ambulance, fire truck, police car, tow truck, search and rescue vehicle, police motorcycle, or any other type of emergency vehicle. The multicolor light device 102 includes lightbars, light sticks and surface mount light devices.

A surface mount light is a light device attached to a surface of the vehicle 102. The surface mount light includes a light attached to an interior or an exterior of a vehicle. A single surface mount light can include a headlight, taillight, brake light, rear view mirror light, side mirror light, light on a bumper, light on a door, light on a hood, a license plate light, or any other light attached or coupled to the vehicle. In some examples, the single surface mount lights are removably attached to a surface of the vehicle. However, the examples are not limited to light devices which are removably attached. In other examples, a single surface mount light can include a light device which is non-removable.

The multicolor light device 102 is a light device having including lights in two or more different colors. The multicolor light device 102 can be a dual-colored light device capable of emitting light in two different colors, a tri-colored light device having three different colored lights, a quad-colored light device having four different colored lights, as well as a device having five or more different colored lights.

In this non-limiting example, the multicolor light device 102 includes a plurality of LED lights 104. For example, the multicolor light device 102 can include a first LED light 106 having a first color 108 and a second LED light 110 having a different second color 112. In this example, the multicolor light device 102 is a dual color light. The two colors can be red and blue, red, and white, blue, and white, or any other combination of two colors. However, the examples are not limited to a dual color light device. In other examples, the multicolor light device includes three or more different colored light devices within the multicolor light device housing.

In still other examples, the multicolor light device 102 is a quad color light device having four different colored LED lights. In these examples, the multicolor light device 102 lights includes one or more red LED lights, one or more white LED lights, one or more blue LED lights and one or more amber LED lights. However, the examples are not limited to red, blue, amber, and white lights. In yet other examples, the multicolor color light device can include other colored lights. For example, the multicolor light device can include green, yellow, orange or any other colored lights.

One or more of the colored lights can be locked at manufacture time. such that the light device is incapable of lighting up or flashing any locked light colors until the locked colors are unlocked. In some examples, all colors are initially locked by default at manufacture time. In these examples, the multicolor light device is incapable of functioning/lighting up until at least one light color is unlocked. In this manner, the dealer and/or user can select whether to unlock single color, dual color, tri-color or quad color (all four colors). Thus, the device is shipped to the dealer and/or end-user in a completely locked (de-activated) state. If the user prefers the single-color option, the end-user or dealer licensing the single-color feature selects the single color from the available two or more colors on the multicolor light device for unlocking. Thus, a first user may choose to unlock the white color for a single-color function on a first multicolor light device and another user can choose to unlock the red colored lights for the same single-color function on a second multicolor light device. Still another user can choose to unlock all four colored lights on a third multicolor light device for a quad color light functionality. This enables greater customization and configurability.

In other examples, a single-colored set of lights are unlocked (operable) at manufacture time. For example, the multicolor light device 102 can have only red lights on the device unlocked while the amber lights, blue lights and white lights remain locked and non-functional. In other examples, only the white lights are initially unlocked, such as at the time of device manufacture. In these examples, the multicolor light device 102 is operable to flash all the white lights on the multicolor light device 102 but the red lights, blue lights and amber lights remain non-functional. The light color which is unlocked initially for a single-color function is user-configurable.

The multicolor light device 102 is capable of executing computer-executable instructions 114 (e.g., as application programs, operating system functionality, or both) to implement the operations and functionality associated with the multicolor light device 102. In some examples, the multicolor light device 102 has at least one processor 116 and a memory 118. The multicolor light device 102 optionally includes a user interface component 120.

The processor 116 includes any quantity of processing units and is programmed to execute the computer-executable instructions 114. The computer-executable instructions 114 is performed by the processor 116, performed by multiple processors within the multicolor light device 102 or performed by a processor external to the multicolor light device 102. In some examples, the processor 116 is programmed to execute instructions such as those illustrated in the figures (e.g., FIG. 16, FIG. 17, FIG. 18, FIG. 19, and FIG. 20).

The multicolor light device 102, in other examples, has one or more computer-readable media such as the memory 118. The memory 118 includes any quantity of media associated with or accessible by the multicolor light device 102. The memory 118, in these examples, is internal to the multicolor light device 102 (as shown in FIG. 1). In other examples, the memory 118 is external to the computing device (not shown) or both (not shown).

The memory 118 stores data, such as one or more applications. The applications, when executed by the processor 116, operate to perform functionality on the multicolor light device 102. The applications can communicate with counterpart applications or services such as web services accessible via a network 122. In an example, the applications represent downloaded client-side applications that correspond to server-side services executing in a cloud.

In other examples, the user interface component 120 includes a graphics card for displaying data to the user and receiving data from the user. The user interface component 120 can also include computer-executable instructions (e.g., a driver) for operating the graphics card. Further, the user interface component 120 can include a display (e.g., a touch screen display or natural user interface) and/or computer-executable instructions (e.g., a driver) for operating the display. The user interface component 120 can also include one or more of the following to provide data to the user or receive data from the user: speakers, a sound card, a camera, a microphone, a vibration motor, one or more accelerometers, a Bluetooth® brand communication module, global positioning system (GPS) hardware, and a photoreceptive light sensor.

The network 122 is implemented by one or more physical network components, such as, but without limitation, routers, switches, network interface cards (NICs), and other network devices. The network 122 is any type of network for enabling communications with remote computing devices, such as, but not limited to, a local area network (LAN), a subnet, a wide area network (WAN), a wireless (Wi-Fi) network, or any other type of network. In this example, the network 122 is a WAN, such as the Internet. However, in other examples, the network 122 is a local or private LAN.

In some examples, the system 100 optionally includes a communications interface device 124. The communications interface device 124 includes a network interface card and/or computer-executable instructions (e.g., a driver) for operating the network interface card. Communication between the multicolor light device 102 and other devices, such as but not limited to a user device 126, a cloud server 128 and/or a remote data storage device 130, can occur using any protocol or mechanism over any wired or wireless connection. In some examples, the communications interface device 124 is operable with short range communication technologies such as by using near-field communication (NFC) tags.

The user device 126 represents any device executing computer-executable instructions. The user device 126 can be implemented as a mobile computing device, such as, but not limited to, a wearable computing device, a mobile telephone, laptop, tablet, computing pad, netbook, gaming device, and/or any other portable device. The user device 126 includes at least one processor and a memory. The user device 126 can also include a user interface 132 device. In some examples, the user device 126 connects to the multicolor light device 102 via a universal serial bus (USB) 134 port on the multicolor light device 102.

The cloud server 128 is a logical server providing services to the multicolor light device 102 or other clients, such as, but not limited to, the user device 126. The cloud server 128 is hosted and/or delivered via the network 122. In some non-limiting examples, the cloud server 128 is associated with one or more physical servers in one or more data centers. In other examples, the cloud server 128 is associated with a distributed network of servers.

The cloud server 128, in some non-limiting examples, hosts a remote device manager application which generates unique unlock codes used to unlock one or more functions on the multicolor light device 102. In these examples, a function manager 136 on the multicolor light device 102 manages locked functions on the multicolor light device 102. If a user wants to unlock a selected function on the multicolor light device 102, the user connects the multicolor light device 102 to the user device 126. The user device sends a request to unlock the selected function to the cloud server 128. In response to the request, the cloud server generates the unlock code 138 and transmits the unlock code to the user device 126. The user device 126 provides the unlock code to the multicolor light device 102. The multicolor light device 102 unlocks the selected function, thereby enabling the selected function to operate normally, in response to receiving the unlock code 138. In some examples, the user pays a license fee prior to the cloud server generating and/or sending the unlock code to the user device 126.

The system 100 can optionally include a data storage device 130 for storing data, such as, but not limited to a list of available function(s) 140 for the multicolor light device 102 and a status 142 of each function. An available function is a function the multicolor light device 102 is capable of performing while in an unlock state. The multicolor light device cannot perform the available function if the function is in the locked state. The status 142 indicates which of the available functions are locked (inoperable) and which of the available functions are unlocked (operable). A locked function can be unlocked by the user via a configurator hosted on the cloud server 128.

The data storage device 130 can include one or more different types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The data storage device 130 in this example is a separate device from the multicolor light device 102. The data storage device 130 is accessed by the multicolor light device 102 via the network 122. However, in other examples, the data storage device 130 is included within the multicolor light device 102.

The memory 118, in some examples, stores one or more computer-executable components. Exemplary components include the function manager 136, that, when executed by the processor 116 of the multicolor light device 102, store the list of available functions 140 associated with the plurality of LED lights 104 on the multicolor light device 102 and/or the data storage device 130. The unlock code 138 is received from the user device 126 communicatively coupled to the multicolor light device 102. The unlock code 138, in this example, is associated with at least one selected function in the list of available functions that is locked. The selected function can include a combination of colors and/or a flash pattern. The function manager changes the lock status of the selected function from the locked state to an unlocked state in response to receiving the unlock code 138

In some examples, the device remains in the unlocked state until it is manually changed back to the locked state. If the function state is not changed from the unlocked state to the locked state by a user, the function remains permanently operable. In other examples, the function manager 136 returns the lock status of the selected function from the unlocked state back to the locked state at a termination of a predetermined license time-period.

In the example described above in FIG. 1, at least one function is locked at manufacture time. However, the examples are not limited to locking functions at manufacture time. The one or more functions, in other examples, are locked at an initialization time. The initialization time is a time at which the multicolor light device is initialized. The initialization process can occur during manufacture of the multicolor light device (at manufacture time), after manufacture is complete but prior to shipping, during packaging of the multicolor light device for shipping (shipping preparation), or during initial programming of the device.

The multicolor light device 102 in FIG. 1 is a quad color lightbar device. However, the examples are not limited to a quad color lightbar. In other examples, the multicolor light device can include two colors, three colors, as well as five or more colors. Likewise, the multicolor light device can include a light stick, surface mount light or any other type of emergency vehicle light device.

Figure 2:
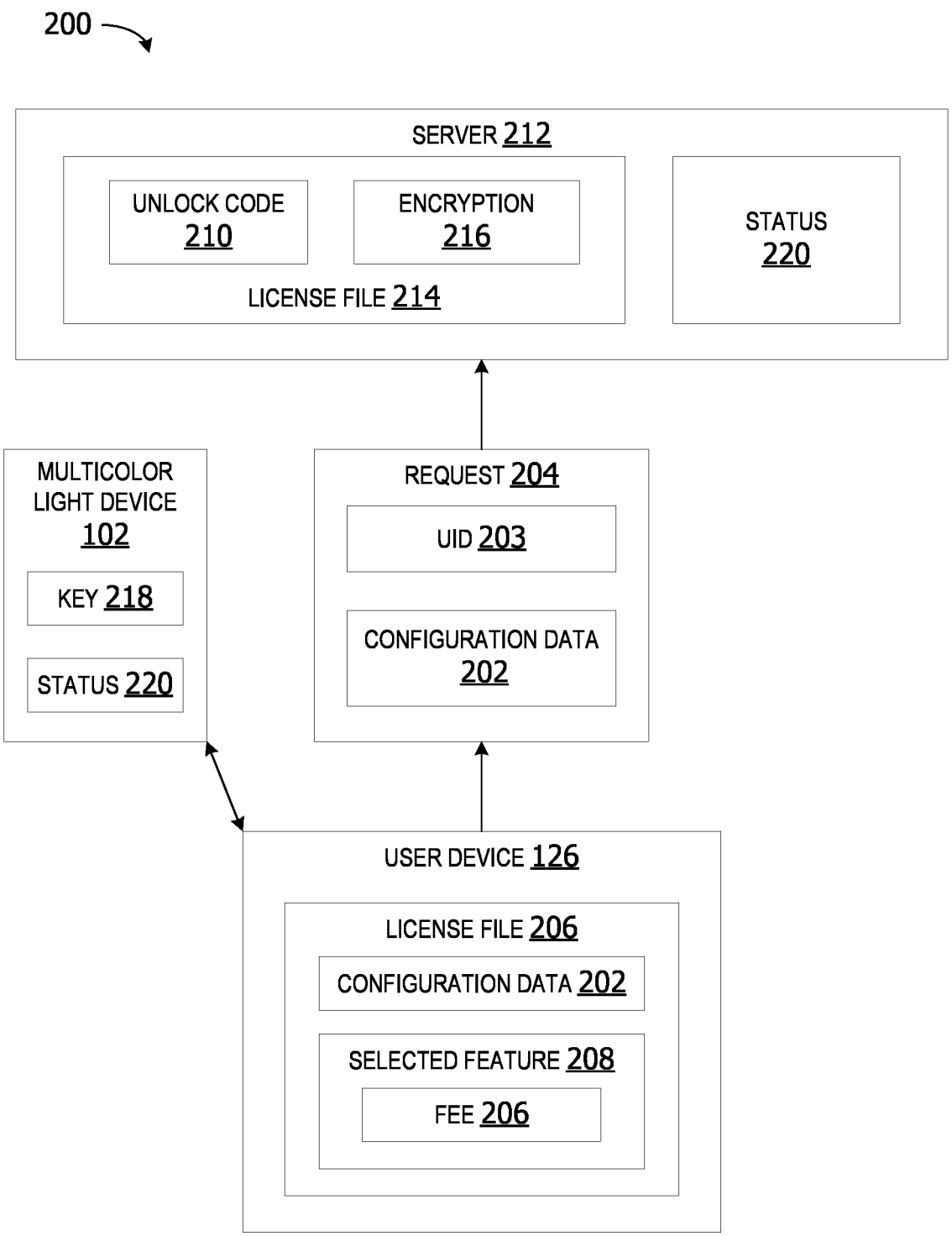
FIG. 2 is an exemplary block diagram illustrating a system for locking functions on a multicolor light device using configuration data.

FIG. 2 is an exemplary block diagram illustrating a system 200 for locking functions on a multicolor light device 102 using configuration data 202. In some examples, a user device 126 generates a request 204 to unlock one or more functions on the multicolor light device 102. The configuration data 202 is data describing the one or more locked functions the user is requesting to unlock. In some examples, the configuration data includes an identification of the selected function 208 and an indication (confirmation) whether the user has paid a fee 206 associated with unlocking the selected function 208.

The request 204 is a request for an unlock code 210. In this example, the request includes the configuration data 202 and a UID 203. In response, a server 212 generates a license file 214 including the unlock code 210. The server is a computing device that generates the unlock code 210. In some examples, the server 212 is implemented as a cloud server, such as, but not limited to, the cloud server 128 in FIG. 1.

The license file 214 is optionally encrypted using one or more encryption 216 key(s), such as, but not limited to, a symmetric or asymmetric cryptographic key. In one example, the license file is encrypted using a private cryptographic key and the license file is decrypted by the user device 126 using a corresponding public cryptographic key. In still other examples, the license file is encrypted using a public key and the user device decrypts the file using a corresponding private key, such as, but not limited to, the cryptographic key 218. The cryptographic key 218 is stored on the multicolor light device 102, in this non-limiting example.

The user device decrypts the license file to obtain the unlock code 210. The unlock code 210 is used to unlock the selected function 208. The status 220 of the selected function is updated on the multicolor light device 102 and/or on the server 212 to indicate the selected function is unlocked.

Figure 3:
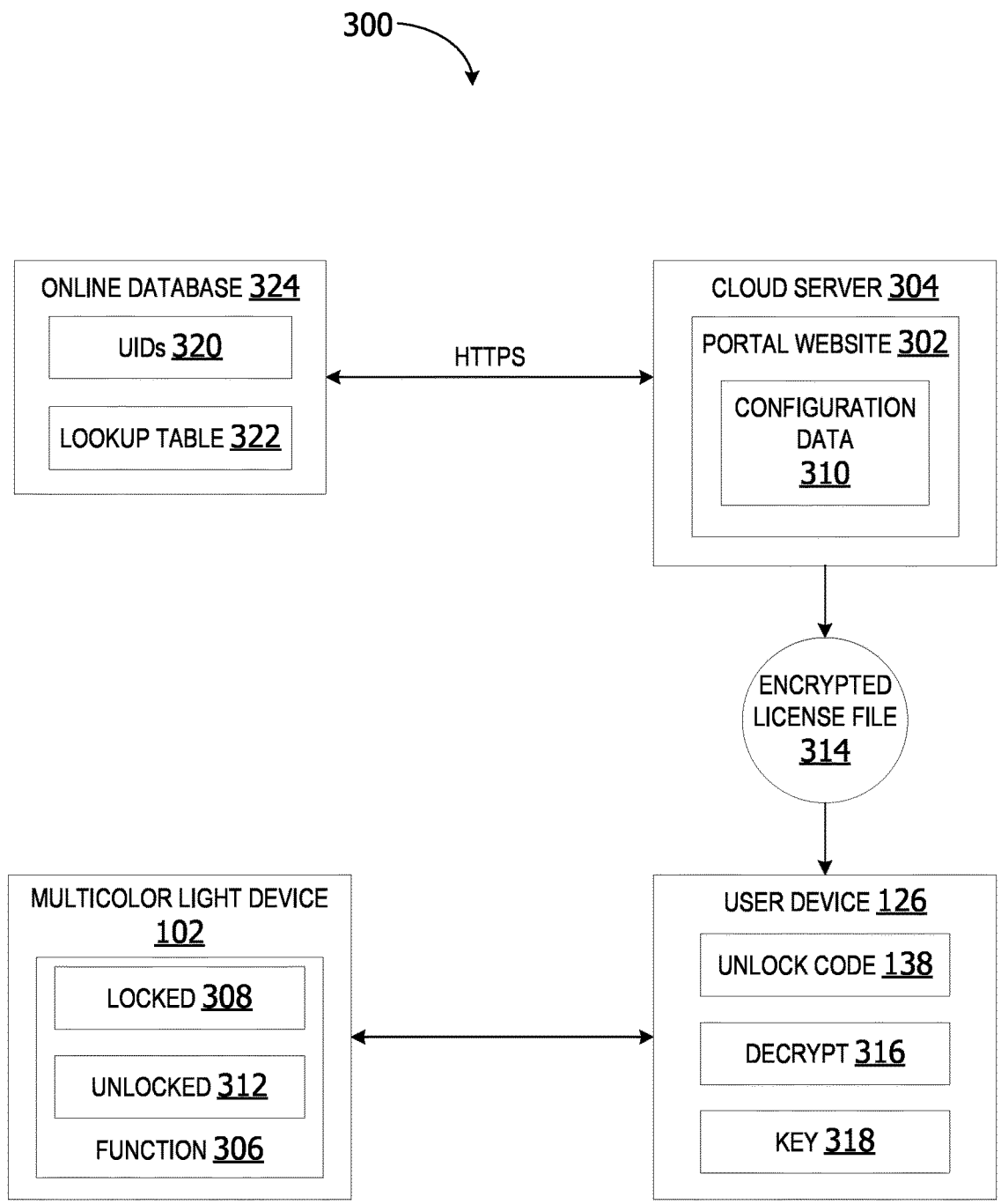
FIG. 3 is an exemplary block diagram illustrating a system for unlocking locked functions on a multicolor light device via a portal website hosted on a cloud server.

Turning now to FIG. 3, an exemplary block diagram illustrating a system 200 for unlocking locked functions on the multicolor light device 102 via a portal website 302 hosted on a cloud server 304 is depicted. In this non-limiting example, the user device 126 connects to the multicolor light device 102. The connection may be a wireless or wired connection. The cloud server 304 is a server, such as, but not limited to, the cloud server 128 in FIG. 1.

In this non-limiting example, the multicolor light device 102 is connected to the user device 126 via a universal serial bus (USB) port on the multicolor light device 102 and/or the user device 126. At least one function 306 is in a locked 308 state in which the function 306 is disabled. The user utilizes the user device 126 to access the portal website 302, which is presented to the user on a user interface, such as, but not limited to, the user interface 132 in FIG. 1. The portal website sends a portal page to the user device 126. The user interacts with the portal page to generate configuration data 310 specifying one or more functions to be unlocked 312. The configuration data 310 is data describing a set of user preferences/selection with regard to one or more functions on the multicolor light device to be licensed (unlocked).

In some examples, the cloud server 304 utilizes the configuration data 310 to generate an encrypted license file 314. The license file is encrypted in some examples using cryptographic keys, such as, but not limited to, a public key and private key. For example, the cloud server 304 encrypts the license file using a public key. The user device 126 uses a private cryptographic key 318 corresponding to the public key to decrypt 316 the file to obtain the unlock code. The unlock code is used by the user device 126 to unlock the locked function 306.

In other examples, the configuration data 310 includes a UID 320 assigned to the multicolor light device 102. In some examples, the UID 320 is assigned and stored on the multicolor light device at manufacture. In other examples, the UID is assigned and programmed onto the multicolor light device at device registration time. The device is registered by connecting the multicolor light device to the user device and logging into the cloud server or other device registration website.

The UID is generated by the remote device manager and assigned to the multicolor light device. Each multicolor light device is assigned a different UID. The remote device manager uses the UID to locate function-related data associated with the multicolor light device 102 in a lookup table 322. In this example, the lookup table is stored in an online database 324, such as, but not limited to, a database on the cloud server or a cloud storage. In other examples, the lookup table 322 is stored on a data storage device accessible by the cloud server 304, such as, but not limited to, the data storage device 130.

In this example, the remote device manager is hosted on the cloud server. In other examples, the remote device manager is hosted on a physical computing device, such as, but not limited to, the server 212 in FIG. 2.

In some examples, a host website generates a license file. The user downloads the license file or generates it on the user computing device. In some examples, the license file is generated via an application which is downloaded from the host website onto the user device.

The user device sends a request, including a UID, such as a serial number, on a hypertext protocol (HTTP) call to a database that stores UID serial numbers for each multicolor light device. Each product/light bar has a unique serial number (UID). Unique serial numbers generated at the server. Every product is warranty dated to identify the date of manufacture. The UID is stored in a database and programmed to each multicolor light device product. The multicolor light device is shipped to the dealer or customer.

In another example, the portal website generates license files sent to the user devices. The user device sends license information to the portal website. It replies and sends configuration data back to website with the level of unlock.

In other examples, the license file is encrypted by the server and decrypted by the client (user device). The encryption, in one example, is advanced encryption standard (AES) 256 or RSA asymmetric or symmetric encryption using public key and private key encryption. In one example, the private key is known only to the multicolor light device product and used to decrypt the license file to obtain the unlock code.

In other examples, the multicolor light device includes a receive device (RX) and a transmit device (TX). The multicolor light device connection point in another example utilizes RS45 protocols to USB. A network call can be performed wirelessly connects to the user device via Wi-Fi, near field communication (NFC), Bluetooth®, ultrawide band (UWB), or any other type of wireless communication using transistor-transistor logic (TTL) or secure socket layer (SSL) for encrypted communication.

Figure 4:
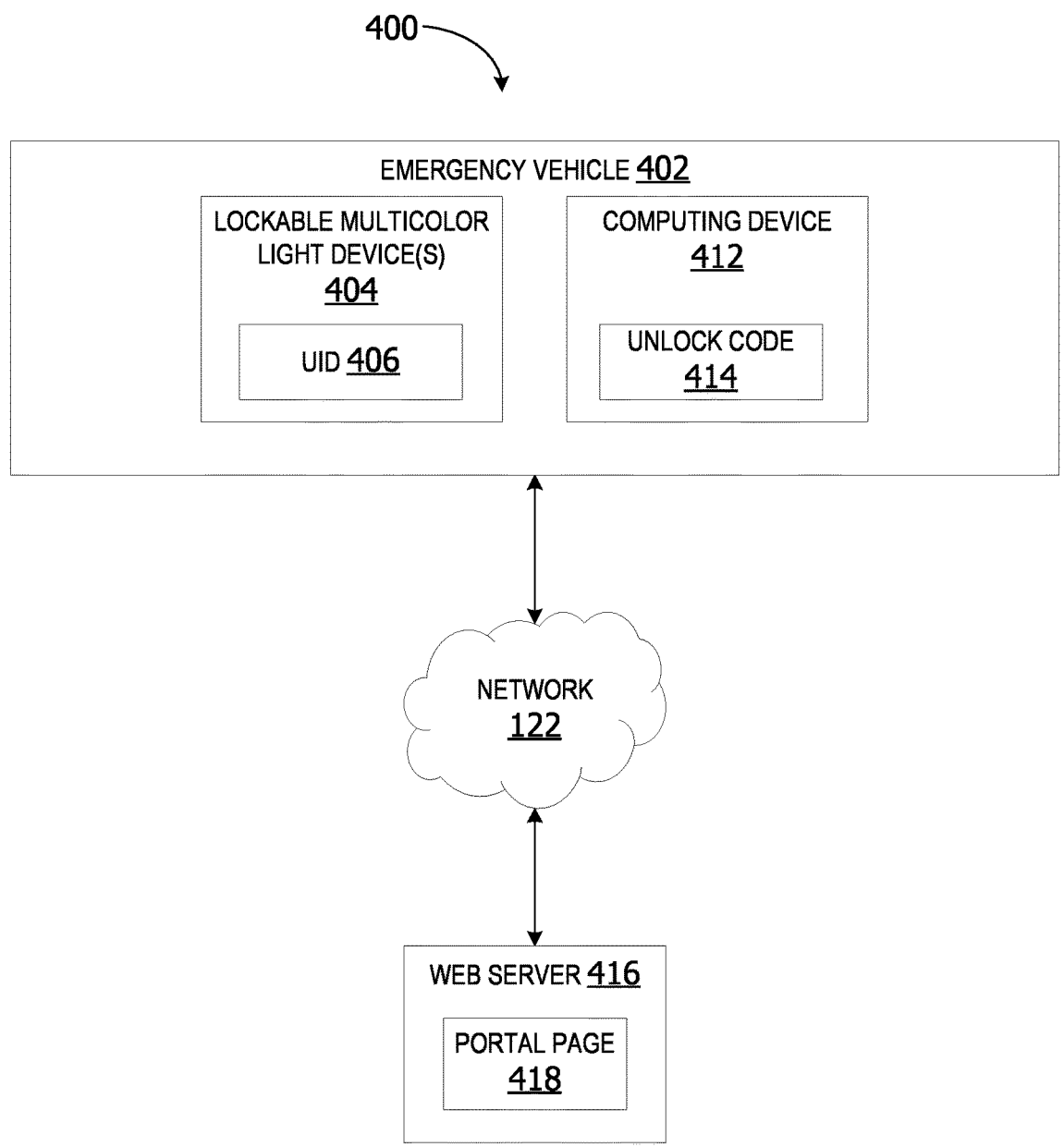
FIG. 4 is an exemplary block diagram illustrating a system for unlocking one or more functions on a multicolor light device installed on an emergency vehicle.

Referring now to FIG. 4, an exemplary block diagram illustrating a system 400 for unlocking one or more functions on a multicolor light device installed on an emergency vehicle 402 is shown. The emergency vehicle 402 is implemented as any type of emergency vehicle, such as, but not limited to, a police car, police truck, ambulance, tow truck, fire truck, search and rescue vehicle, police motorcycle, etc.

The emergency vehicle 402, in this non-limiting example, includes one or more multicolor light devices installed on the emergency vehicle 402. The lockable multicolor light device is assigned a UID 406.

The emergency vehicle 402, in this non-limiting example, includes an onboard computing device 412. The onboard computing device includes a processor and memory The computing device receives an unlock code 414 to unlock one or more functions on the lockable multicolor light device.

A unique unlock code is required for a first lockable multicolor light device and a different unlock code is required to unlock function(s) on a second lockable multicolor light device. In other examples, a different unlock code is required to unlock each different function on the same multicolor light device. Thus, the unlock code is unique to each device and/or unique to each function on a given device.

In this example, the web server 416 is a computing device or cloud server for hosting a web page or portal page 418, such as, but not limited to, the cloud server 128 in FIG. 1 and/or the server 212 in FIG. 2. In this manner, the user can utilize the computing device connected to the multicolor light device to unlock one or more functions of the multicolor light device without detaching the multicolor light device from the emergency vehicle. However, the examples are not limited to connecting the multicolor light device(s) to a computing device while installed on an emergency vehicle. In other examples, a multicolor light device is attached to a user device or other computing device before the multicolor light device is installed on an emergency vehicle 402 and/or the multicolor light device is uninstalled from the emergency vehicle when the user wants to unlock additional functions.

Figure 5:
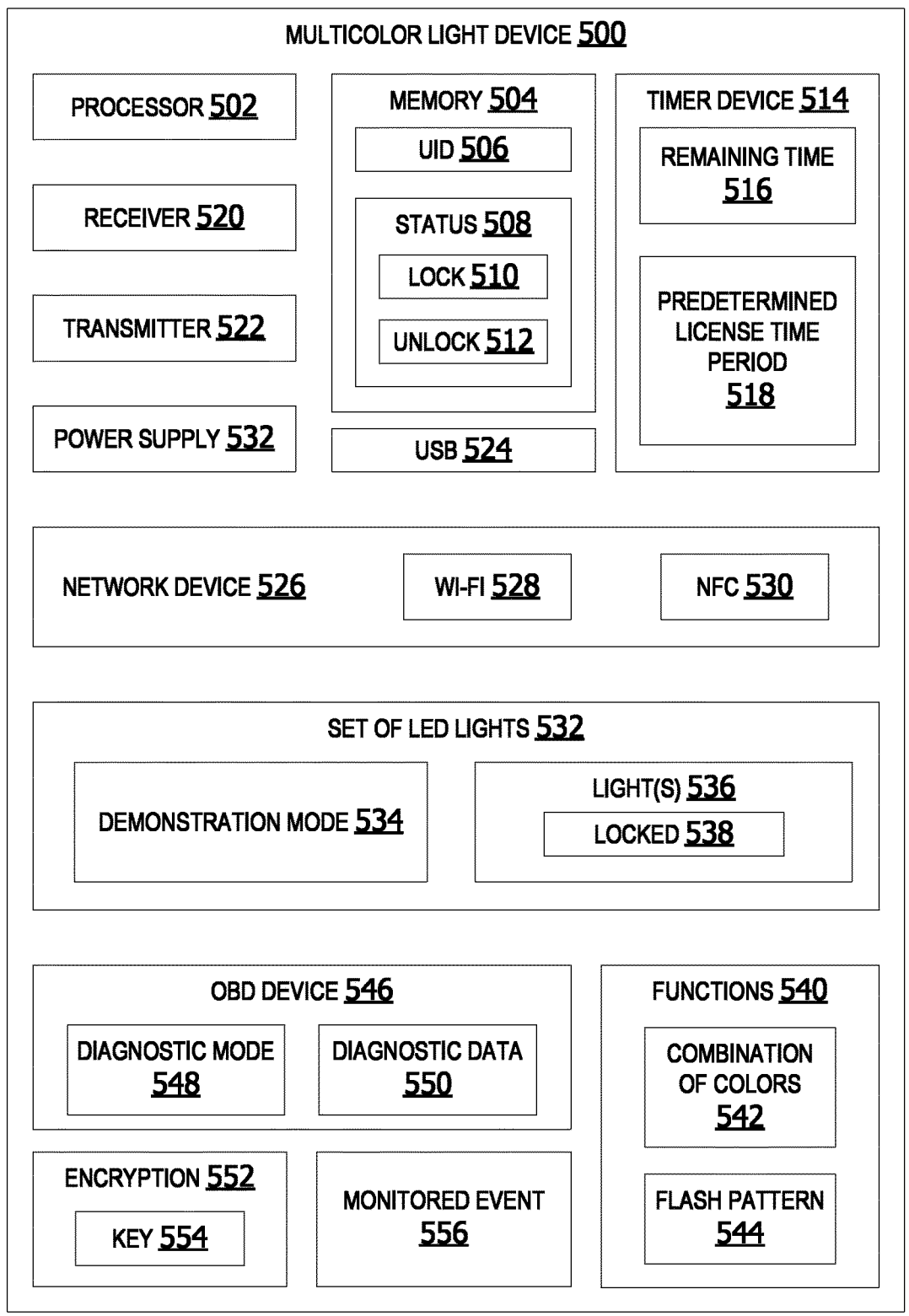
FIG. 5 is an exemplary block diagram illustrating a multicolor light device.

FIG. 5 is an exemplary block diagram illustrating a multicolor light device 102. The multicolor light device 102 includes at least one processor 502 communicatively coupled to a memory 504. The memory 504, in this example, stores a UID 506 assigned to the multicolor light device 102 and/or a status 508 of one or more functions on the multicolor light device 102. The status 508 is a lock 510 or an unlock 512 status.

In this example, a timer device 514 monitors remaining time 516 associated with a monitored event 556, such as, but not limited to, an expiration or renewal date associated with a predetermined license time-period 518 for a licensed function. In some examples, the timer device monitors events, such as, but not limited to, an expiration of the license time-period, expiration of a warranty, a maintenance due date, a license renewal reminder date, a warranty renewal reminder date and/or any other user-defined event.

A renewal reminder and/or an expiration notification is sent to the user device upon occurrence of the monitored event.

In some examples, the timer device 514 is a clock or other device for measuring a passage of time. In still other examples, the timer device 514 is a global positioning system (GPS) based device which calculates a duration of time based on GPS data.

The multicolor light device 102 communicates with the user device via a communications device, such as, but not limited to, the communications interface device 124 in FIG. 1. In some examples, the multicolor light device 102 includes a receiver (Rx) for receiving data and/or a transmitter (Tx) for transmitting data to one or more other devices. In still other examples, the multicolor light device 102 connects with the user device via a wired connection to a USB 524 port. In still other examples, a network device 526 enables the multicolor light device 102 to exchange data with the user device via Wi-Fi 528 and/or a near field communication (NFC).

In some examples, the multicolor light device 102 performs network calls using Wi-Fi 528, NFC, Bluetooth®, transistor-to-transistor logic (TTL) communications and/or secure socket layer (SSL). However, the system is not limited to wireless communications. As discussed above, the multicolor light device can also communicate with the user device via a wired communication, such as, but not limited to, USB, ethernet, or other wired communications.

The multicolor light device 102 includes a set of LED lights 532 having one or more light(s) 536 in a locked 538 state. The light(s) 536 in the locked state can operate in a demonstration mode 534 while the multicolor light device 102 is connected to the user device. Otherwise, the locked light(s) 536 remain inoperable until the state is updated from the locked to the unlocked state.

The set of LED lights 532 have a plurality of available functions 540. The functions 540 include one or more combinations of colors, brightness, flash speed (rate of flash) and/or one or more flash patterns 544. Each function can be locked or unlocked.

An on-board diagnostic (OBD) 546 enables the multicolor light device 102 to initiate a diagnostic mode 548 to test one or more functions of the multicolor light device 102. In the diagnostic mode, the test(s) are performed to generate diagnostic data indicating a functional state of one or more lights in the plurality of lights on the multicolor light device 102.

The multicolor light device 102 optionally also includes an encryption 552 key 554 for encrypting or decrypting data. In this example, the key 554 is a key for decrypting an unlock code received from the cloud server 128 in FIG. 1 and/or the server 212 in FIG. 2.

Figure 6:
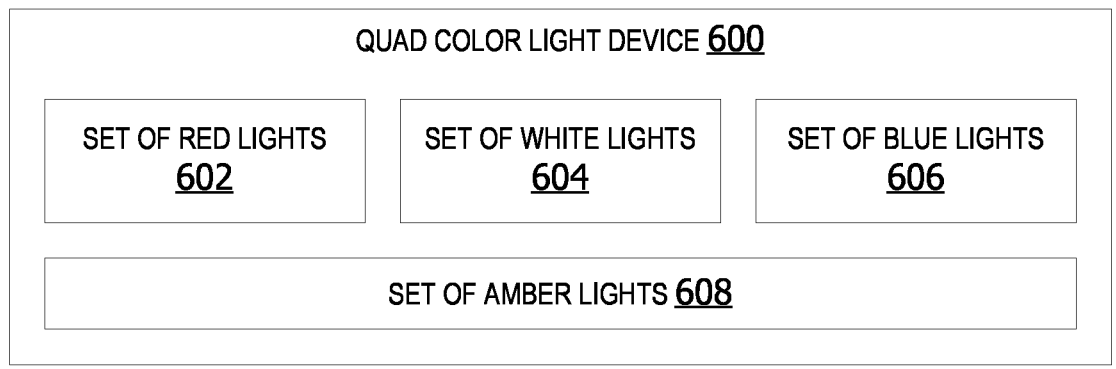
FIG. 6 is an exemplary block diagram illustrating a quad color light device.

Turning now to FIG. 6, an exemplary block diagram illustrating a quad color light device 600 is shown. The quad color light device 600, in this non-limiting example, includes a set of one or more red lights 602, a set of one or more white lights 604, a set of one or more blue lights 606 and/or a set of one or more amber lights 608. However, the multicolor light device is not limited to these four light colors. In other examples, the multicolor light device can include any number of light colors, as well as one or more colors not shown in FIG. 6. For example, the multicolor light device can include green lights, orange lights, yellow lights, as well as any other colors not shown in FIG. 6.

Figure 7:
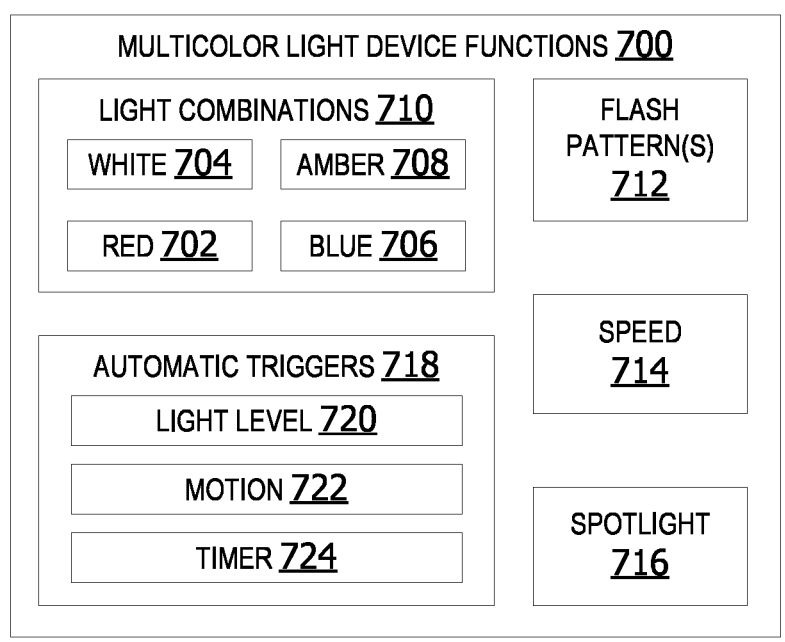
FIG. 7 is an exemplary block diagram illustrating multicolor light device functions.

FIG. 7 is an exemplary block diagram illustrating multicolor light device functions 700. The multicolor light device is a device having two or more colored lights, such as, but not limited to, a dual colored lightbar, a tri-color lightbar, a quad color lightbar or a lightbar having five or more different colored lights. In this example, the multicolor light device is a quad color light device having the colors red 702, white 704, blue 706 and amber 708. The multicolor light device is a LED quad color light.

The available light colors are lockable. Thus, the multicolor light device can be sold with all four light colors disabled such that the light device does not function as a light at all unless at least one light color is licensed. In other examples, the light device is sold or shipped to a dealer/customer as a single-color light device having three of the four colors locked and only a single color unlocked for use. In these examples, when a dealer or end user receives the light device, only a single color is operable. If the amber 708 is operable, the multicolor light device only functions to illuminate the amber lights while the red, blue, and white lights remain inoperable until the dealer or user chooses to unlock one or more of the lights or light combination 710.

A light combination 710 is a combination of two or more lights in the available light colors on the multicolor light device which are operable. In one example, a light combination 710 can include red and blue while the white and amber are inoperable. In this case, the light device functions as a dual color light capable of flashing red and blue lights in one or more flash pattern(s) 712.

In another example, a light combination 710 can include all four colored lights unlocked for use. In this example, there may be dozens of possible flash patterns available enabling the user to choose to flash a single-color light, two lights, three lights or all four lights in various possible flash patterns.

Other functions on a multicolor light device can include speed 714 of a flashing light. A light or combination of lights can flash on and off at different speeds. The speed 714 option enables a user to select one or more speeds of light flashing in one or more flash patterns for one or more lights in the possible light combinations.

A spotlight 716 function enables one or more of the LED lights on the multicolor light device to shine a steady light in one or more directions like a spotlight. The automatic triggers 718 include one or more user-configurable triggers for automatically turning a light or combination of lights on or off. A light level 720 can trigger a light turning on or off. For example, a light can be programmed to turn on when ambient light levels fall below a minimum threshold level, such as, but not limited to, automatically turning on headlights at sunset. In another example, a light can be programmed to automatically turn off in response to a light level exceeding a threshold light level, such as, but not limited to, headlights turning off when exterior light levels make headlights unnecessary.

A motion sensor detecting motion 722 can trigger automatic activation or de-activation of one or more lights. For example, a light can be programmed to turn on if movement is detected near a vehicle or if a user comes into contact with the vehicle.

A timer 724 function can enable programming a light or combination of lights to activate (turn on) or de-activate (turn off). For example, a light can be programmed to automatically turn off after a pre-determined period of time or automatically turn on at a given time.

Figure 8:
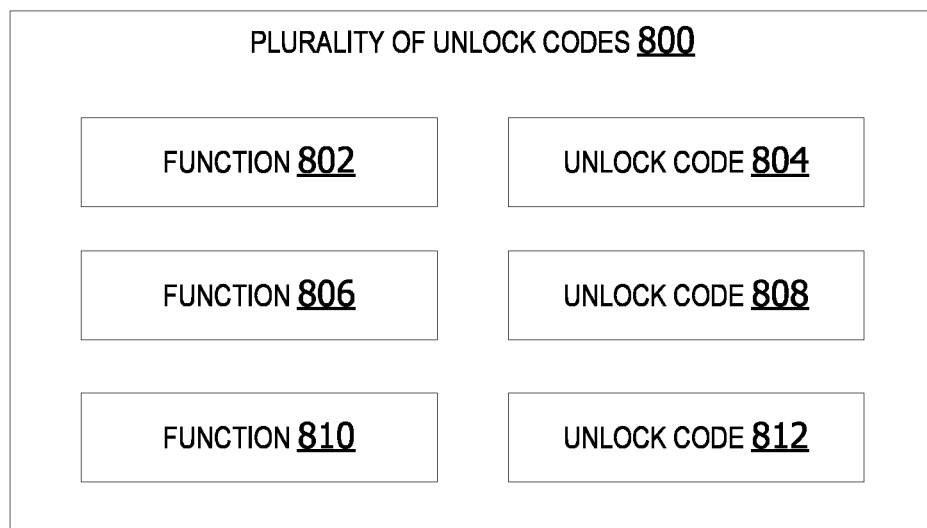
FIG. 8 is an exemplary block diagram illustrating a plurality of unlock codes associated with a plurality of functions on a multicolor light device.

Referring to FIG. 8, an exemplary block diagram illustrating a plurality of unlock codes 800 associated with a plurality of functions on a multicolor light device is depicted. In this example, each function has a unique unlock code. In this non-limiting example, a first function 802 of a multicolor light device is unlocked using a first unlock code 804. A second function 806 of the same multicolor light device is unlocked using a different, second unlock code 808. A third function 810 associated with the multicolor light device is unlocked using a third unlock code 812. The third unlock code is different than the first unlock code 804 and the second unlock code 808.

Figure 9:
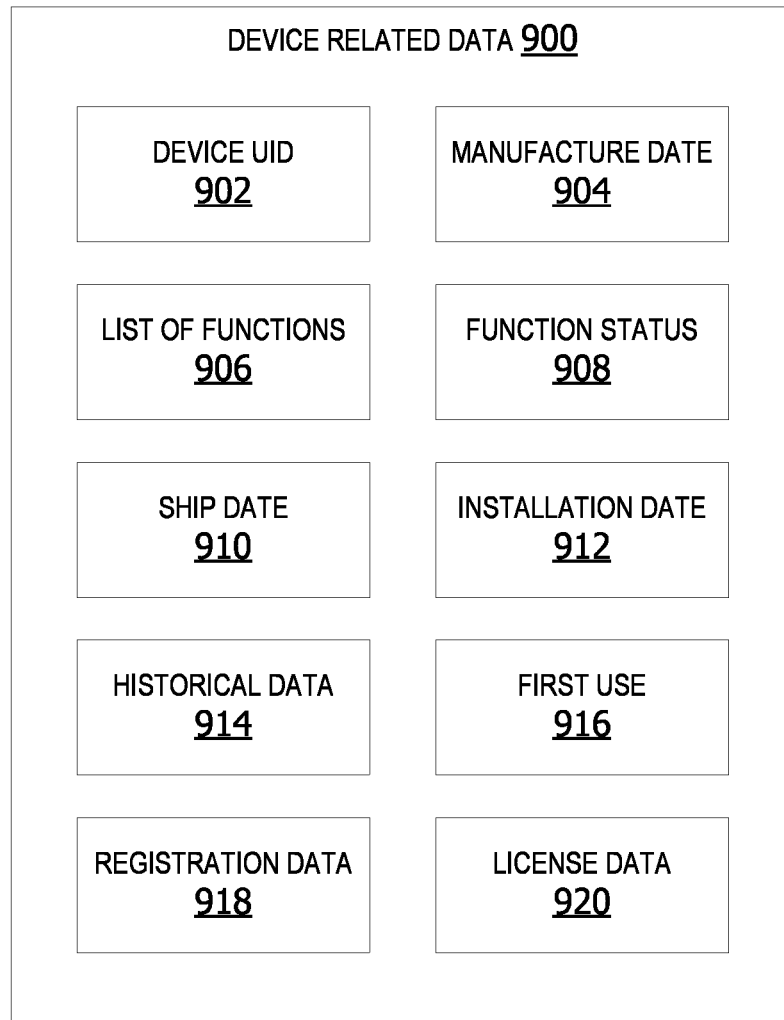
FIG. 9 is an exemplary block diagram illustrating device-related data associated with a multicolor light device.

FIG. 9 is an exemplary block diagram illustrating device-related data 900 associated with a multicolor light device. The device related data 900 is data associated with a multicolor light device. The device related data 900 can include device UID 902 assigned to the device. The manufacture date 904 is a date on which the device was produced or manufactured.

The aggregated data can also include a list of available functions 906 for each registered device, both locked functions as well as unlocked functions. The list of functions 906 can include a function status 908 for each function. The function status indicates whether a given function is locked or unlocked. A registered device is a multicolor light device which has been registered by a user and/or a device on which at least one function has been unlocked. An unregistered multicolor light device is a device in manufacturer inventory or dealer inventory which has not yet been installed on a vehicle, registered by an end-user and/or licensed additional functions beyond basic functions which are unlocked at manufacture time.

The device related data can further include a ship date 910 on which the device was shipped to a dealer or other purchaser, installation date 912 on which the device was installed on a vehicle, first use 916 indicating the date on which the device was first activated or put into service, as well as other historical data 914.

The registration data 918 and/or license data 920 is optionally also included in the device related data 900. The device related data is stored with aggregated function-related data in the aggregated data store.

Figure 10:
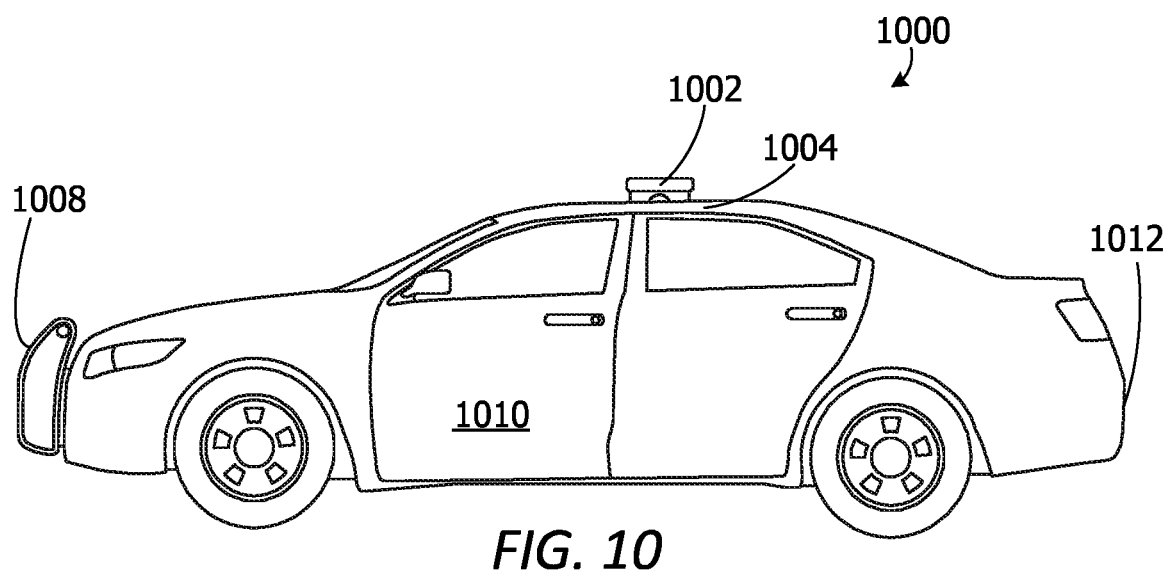
FIG. 10 is an exemplary block diagram illustrating an emergency vehicle sedan including a multicolor light device.

Referring now to FIG. 10, an exemplary block diagram illustrating an emergency vehicle sedan 1000 including a multicolor light device is shown. In this example, the multicolor light device is a multicolored lightbar installed on an exterior surface of a roof 1004 of the vehicle. In other examples, the vehicle sedan 1000 can include a lightbar mounted to a front grill 1008, a door 1010, a rear bumper 1012 or any other part of the vehicle.

Figure 11:
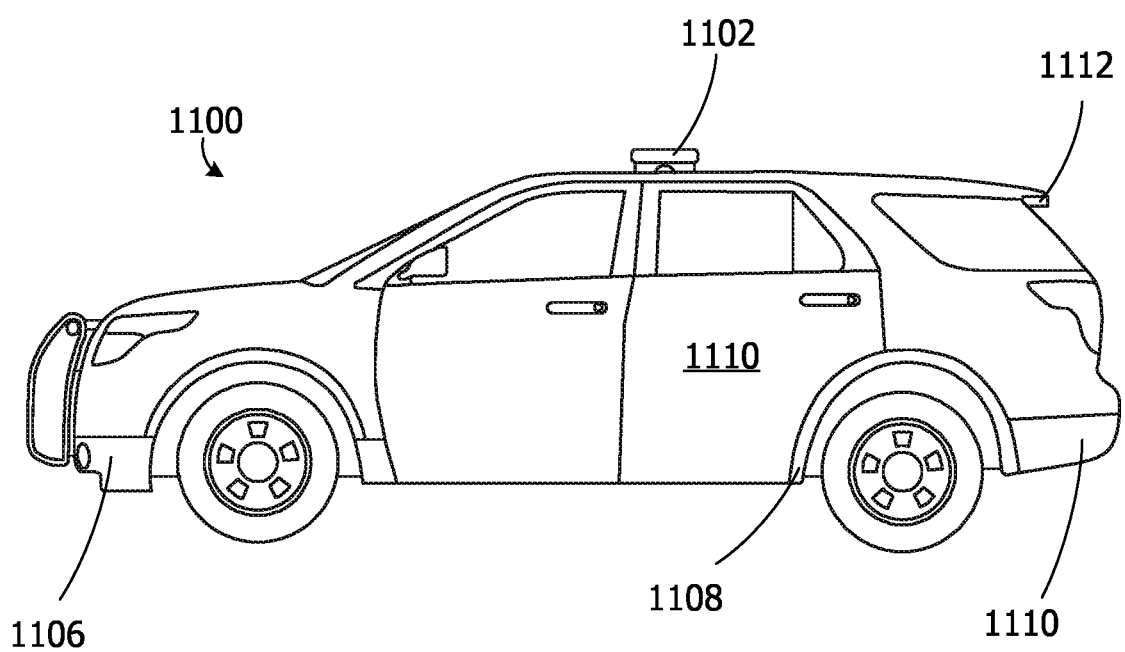
FIG. 11 is an exemplary block diagram illustrating an emergency vehicle sport utility vehicle (SUV) including a multicolor light device.

FIG. 11 is an exemplary block diagram illustrating an emergency vehicle sport utility vehicle (SUV) 1100 including a multicolor light device. In this example, the multicolor light device is a multicolor LED lightbar 1102 mounted to the roof of the vehicle 1100. Other multicolor light devices on the vehicle 1100 can include a multicolor LED light mounted to a front bumper 1106, a wheel rim 1108, a bumper 1110 and/or a rear lightbar 1112.

Figure 12:
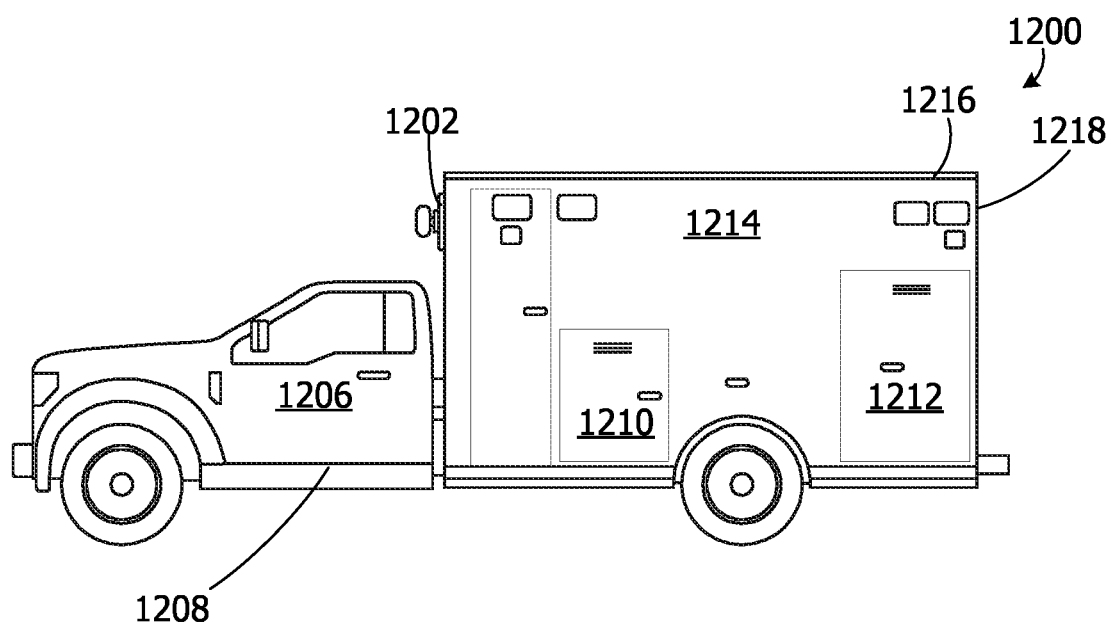
FIG. 12 is an exemplary block diagram illustrating an emergency vehicle pickup truck including a multicolor light device.

FIG. 12 is an exemplary block diagram illustrating an emergency vehicle truck 1200 including a multicolor light device. In this example, the truck includes a multicolor lightbar 1202 having one or more functions which can be locked at manufacture and unlocked by a user by obtaining an unlock code.

The vehicle can optionally also include one or more additional lockable multicolor light devices mounted on an interior or exterior of the truck. For example, a lockable multicolor light device can be mounted to locations such as, but not limited to, a running board 1208, compartment door 1210 and 1212, side 1214, roof 1216, back 1218 and/or any other portion of the vehicle truck 1200.

Figure 13:
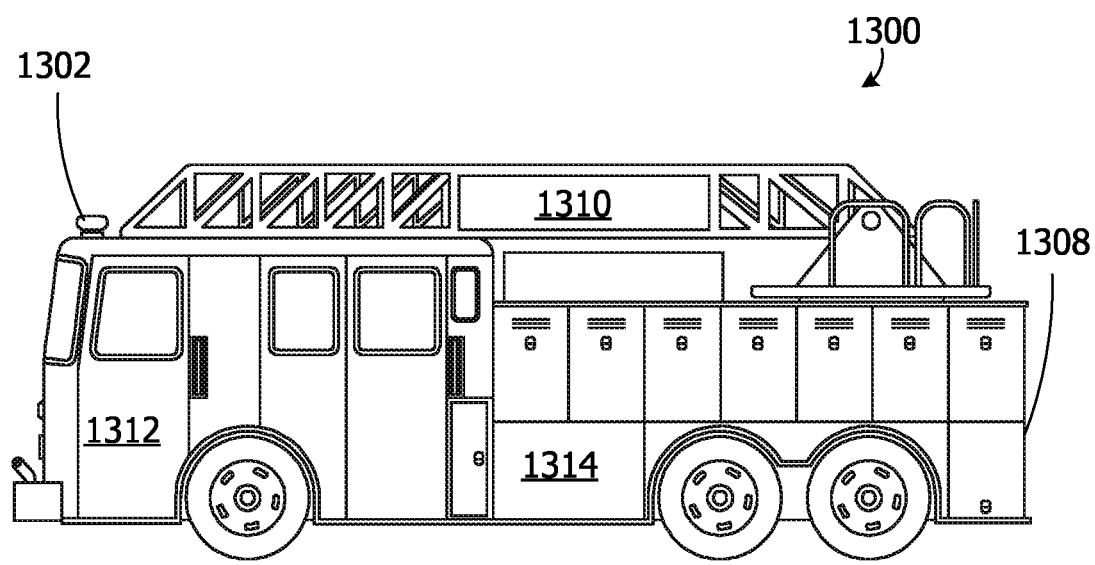
FIG. 13 is an exemplary block diagram illustrating an emergency vehicle firetruck including a multicolor light device.

Turning to FIG. 13, an exemplary block diagram illustrating an emergency vehicle firetruck 1300 including a multicolor light device is shown. In this example, a lockable multicolor LED lightbar 1302 is mounted to a roof of a firetruck cab. In other examples, one or more multicolor LED lights are mounted on the side 1314, back 1308, ladder 1310 and/or door 1312 of the firetruck 1300.

Figure 14:
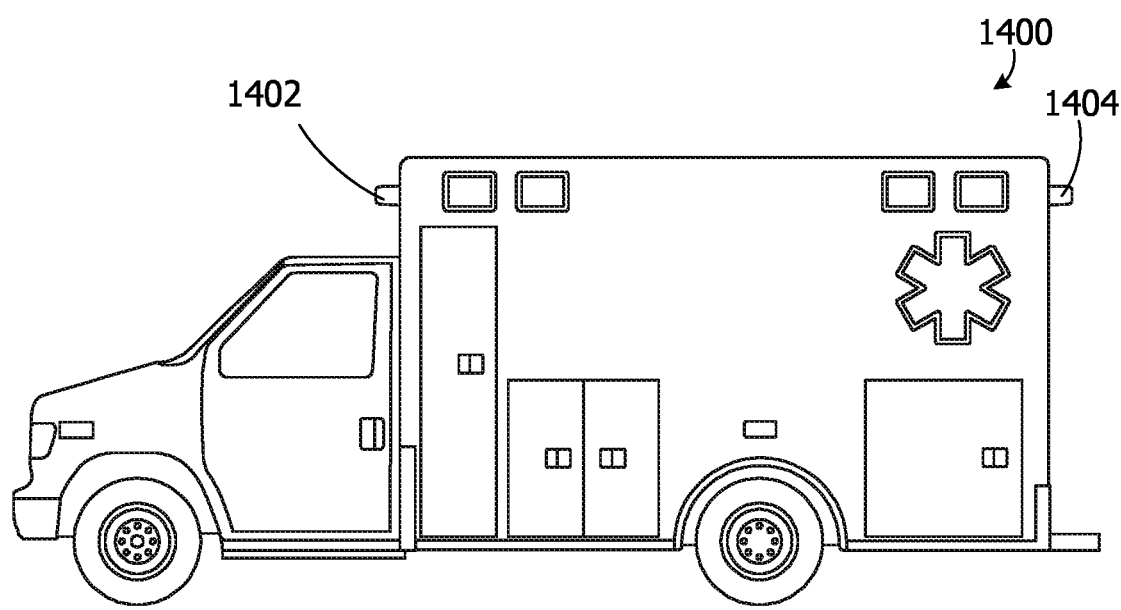
FIG. 14 is an exemplary block diagram illustrating an emergency vehicle ambulance including a multicolor light device.

FIG. 14 is an exemplary block diagram illustrating an emergency vehicle ambulance 1400 including a multicolor light device. In this example, a lockable multicolor LED lightbar 1402 is mounted to a front portion of the ambulance above the cab and another multicolor LED lightbar 1404 is mounted to a back portion of the ambulance.

Figure 15:
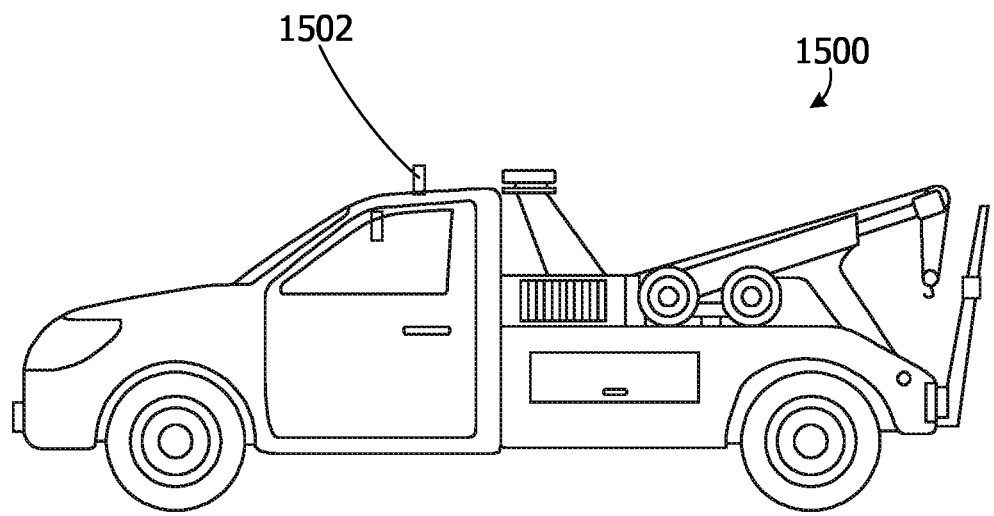
FIG. 15 is an exemplary block diagram illustrating an emergency vehicle tow truck including a multicolor light device.

FIG. 15 is an exemplary block diagram illustrating an emergency vehicle tow truck 1500 including a plurality of lights. The tow truck 1500 includes a lockable multicolor lightbar 1502 mounted to the exterior surface of the roof of the tow truck. In other examples, the tow truck can include one or more other multicolor light devices mounted to one or more other locations on the exterior of the tow truck 1500.

Figure 16:
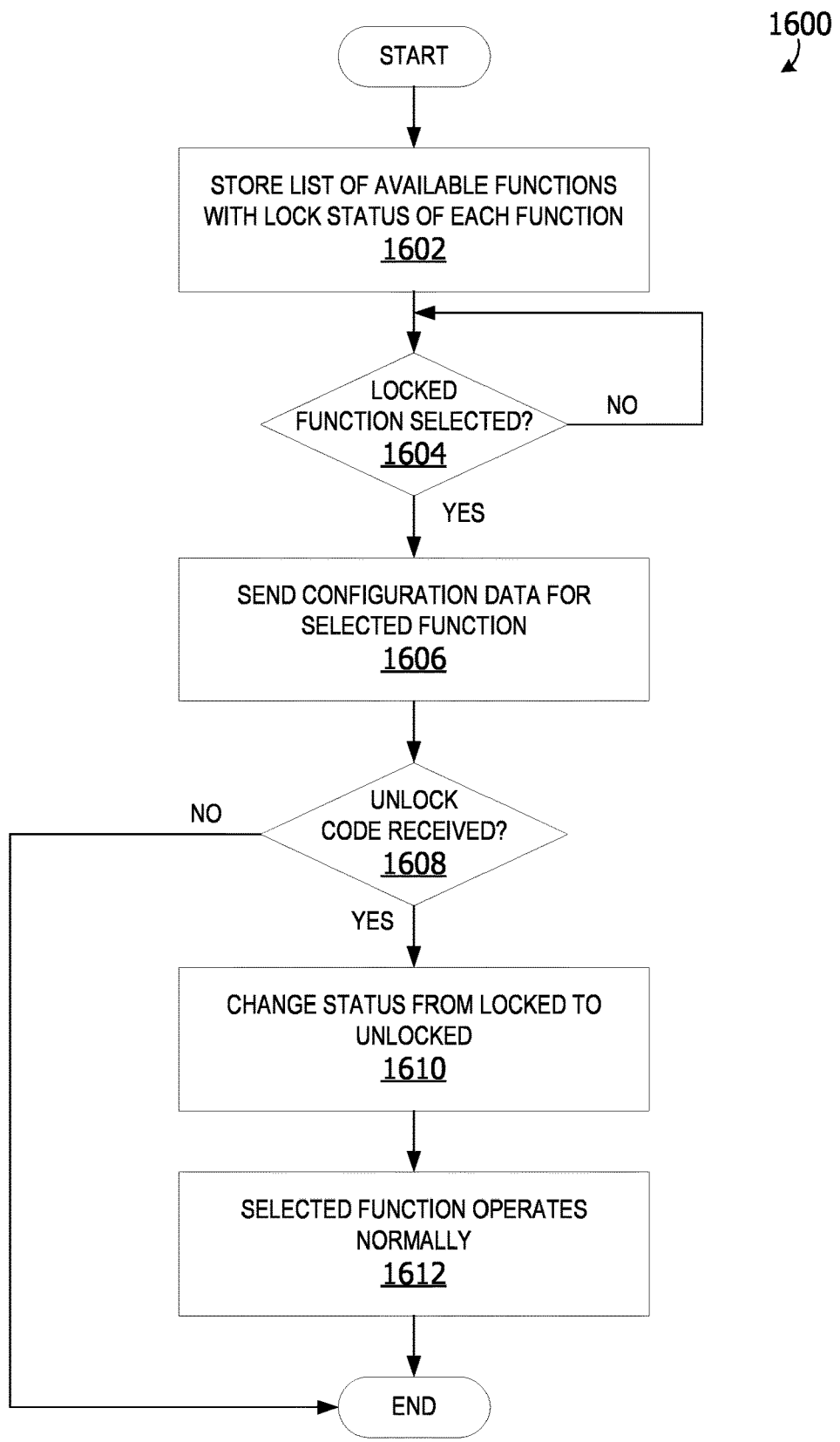
FIG. 16 is an exemplary flow chart illustrating operation of the computing device to unlock functions on a lockable multicolor light device.

Referring to FIG. 16, an exemplary flow chart 1600 illustrating operation of the computing device to unlock functions on a lockable multicolor light device is depicted. The process shown in FIG. 16 is performed by a function manager executing on a computing device, such as, but not limited to, the multicolor light device 102 in FIG. 1 and/or the user device 126 in FIG. 1.

The process begins by storing a list of available functions with a lock status of each function at 1602. The list of available functions is displayed on a user interface, such as, but not limited to, the user interface 132 on the user device 126 in FIG. 1. In some examples, the user interface display can optionally include a virtual reality (VR) display, an augmented reality (AR) display and/or a mixed reality (MR) display.

The function manager on the multicolor light device determines if a locked function is selected at 1604. If a locked function is selected at 1604, configuration data for the selected function is sent to a remote computing device at 1606. The remote computing device generates an unlock code which is capable of unlocking each of the selected locked functions. A determination is made whether the function manager on the multicolor light device received the unlock code at 1608. If yes, the function manager updates the lock status of the selected function from the lock state the unlocked state at 1610. The selected function operates normally after being unlocked at 1612. The process terminates thereafter.

Figure 17:
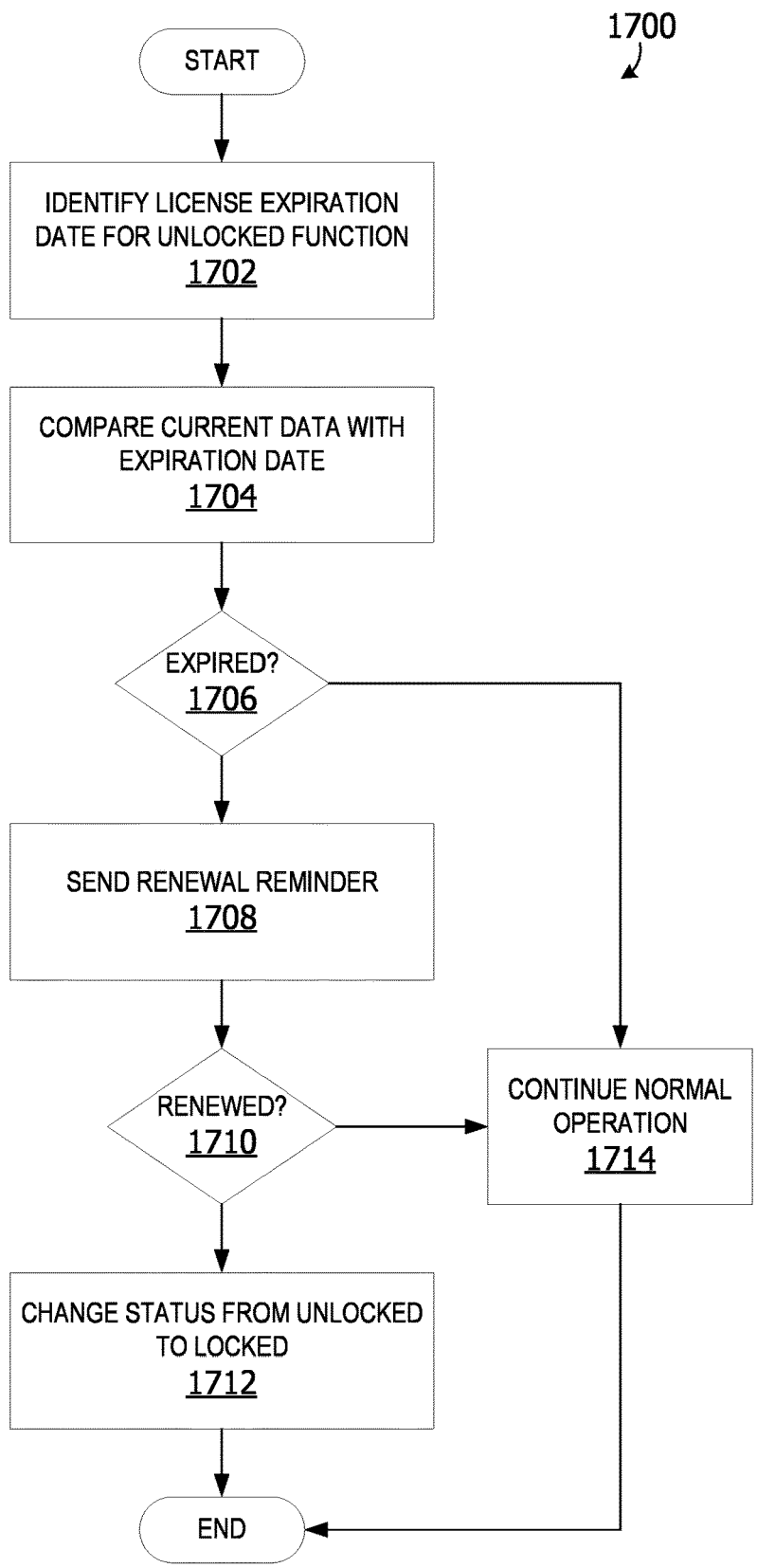
FIG. 17 is an exemplary flow chart illustrating operation of the computing device to generate renewal reminders associated with license expirations.

FIG. 17 is an exemplary flow chart 1700 illustrating operation of the computing device to generate renewal reminders associated with license expirations. The process shown in FIG. 17 is performed by a function manager executing on a computing device, such as, but not limited to, the multicolor light device 102 in FIG. 1 and/or the user device 126 in FIG. 1.

The process begins by identifying a license expiration date for an unlocked function at 1702. The current date is compared with a first expiration date at 1704. A determination is made whether the license is expired or about to expire at 1706. A license is about to expire if the current date is within a user-configured time period from the expiration date. If yes, the function manager sends a renewal reminder at 1708. The renewal reminder is sent to the user device associated with the user. The function manager determines if the license is renewed at 1710. If no, the function manager changes the status of the function from unlocked to locked when the first expiration date is reached at 1712. If the license is renewed, the first expiration date is updated to a second expiration date consistent with the renewed license. The unlocked function continues normal operation as an unlocked function until the renewed second license expiration date at 1714. The process terminates thereafter.

Figure 18:
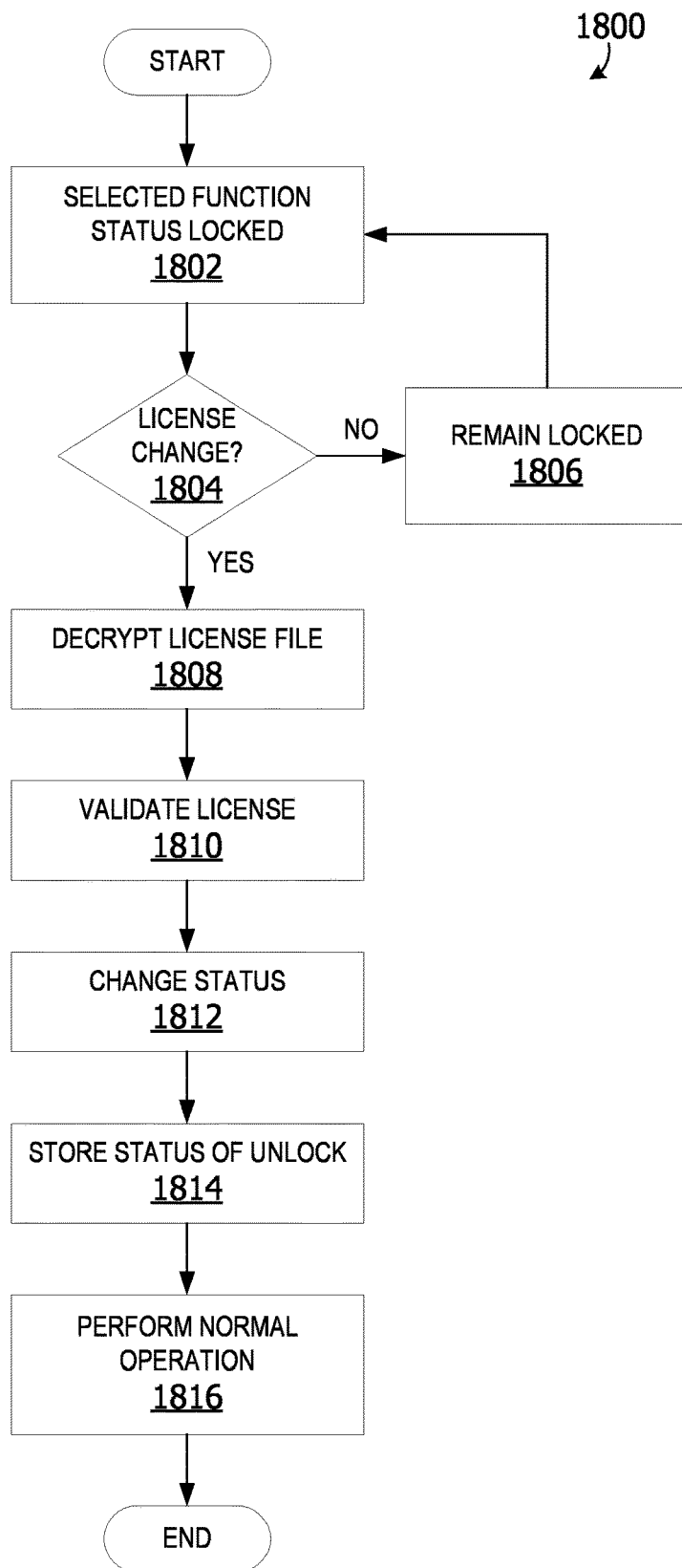
FIG. 18 is an exemplary flow chart illustrating operation of the computing device to validate license files for unlocking functions on a multicolor light device.

FIG. 18 is an exemplary flow chart 1800 illustrating operation of the computing device to validate license files for unlocking functions on a multicolor light device. The process in FIG. 18 is performed by a function manager executing on a computing device, such as, but not limited to, the multicolor light device 102 in FIG. 1 and/or the user device 126 in FIG. 1.

The process begins when a selected function status is locked at 1802. The function manager determines if a license is changed at 1804. If no, the status of the function remains locked at 1806. If the license is changed at 1804, the function manager decrypts the license file at 1808. In some examples, the encrypted license file is received from a remote server. The license is validated at 1810. The function manager changes the lock status from locked to unlocked at 1814 if the license is validated. The status of unlock is stored on the multicolor light device at 1814. In some examples, the lock status is stored on a memory or data storage device on the multicolor light device. The multicolor light device is able to perform normal operation of the unlocked function at 1816. The process terminates thereafter.

Figure 19:
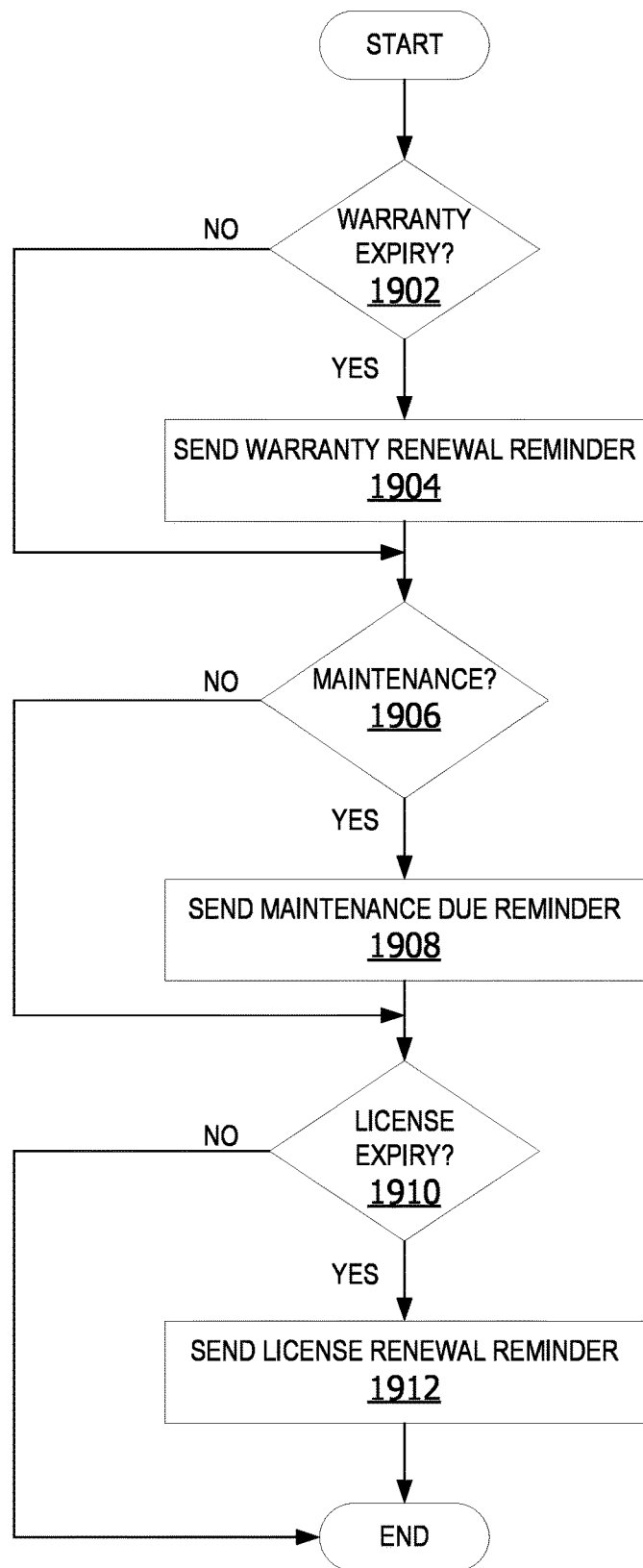
FIG. 19 is an exemplary flow chart illustrating operation of the computing device to generate reminders for users.

FIG. 19 is an exemplary flow chart 1900 illustrating operation of the computing device to generate reminders for users. The process shown in FIG. 19 is performed by a function manager executing on a computing device, such as, but not limited to, the multicolor light device 102 in FIG. 1 and/or the user device 126 in FIG. 1.

The process begins by determining is a warranty is expired at 1902. If yes, a warranty renewal reminder is sent to the user device at 1904. A determination is made whether maintenance is due on the multicolor light device at 1906. If yes, the remote device manager sends a maintenance due reminder to the user device at 1908. The remote device manager determines if a license expiry date is approaching at 1910. In some examples, the expiration date is approaching if the expiration date is within a predetermined time-period from the current date. If yes, the remote device manager sends a license renewal reminder at 1912. The process terminates thereafter.

While the operations illustrated in FIG. 19 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 19.

Figure 20:
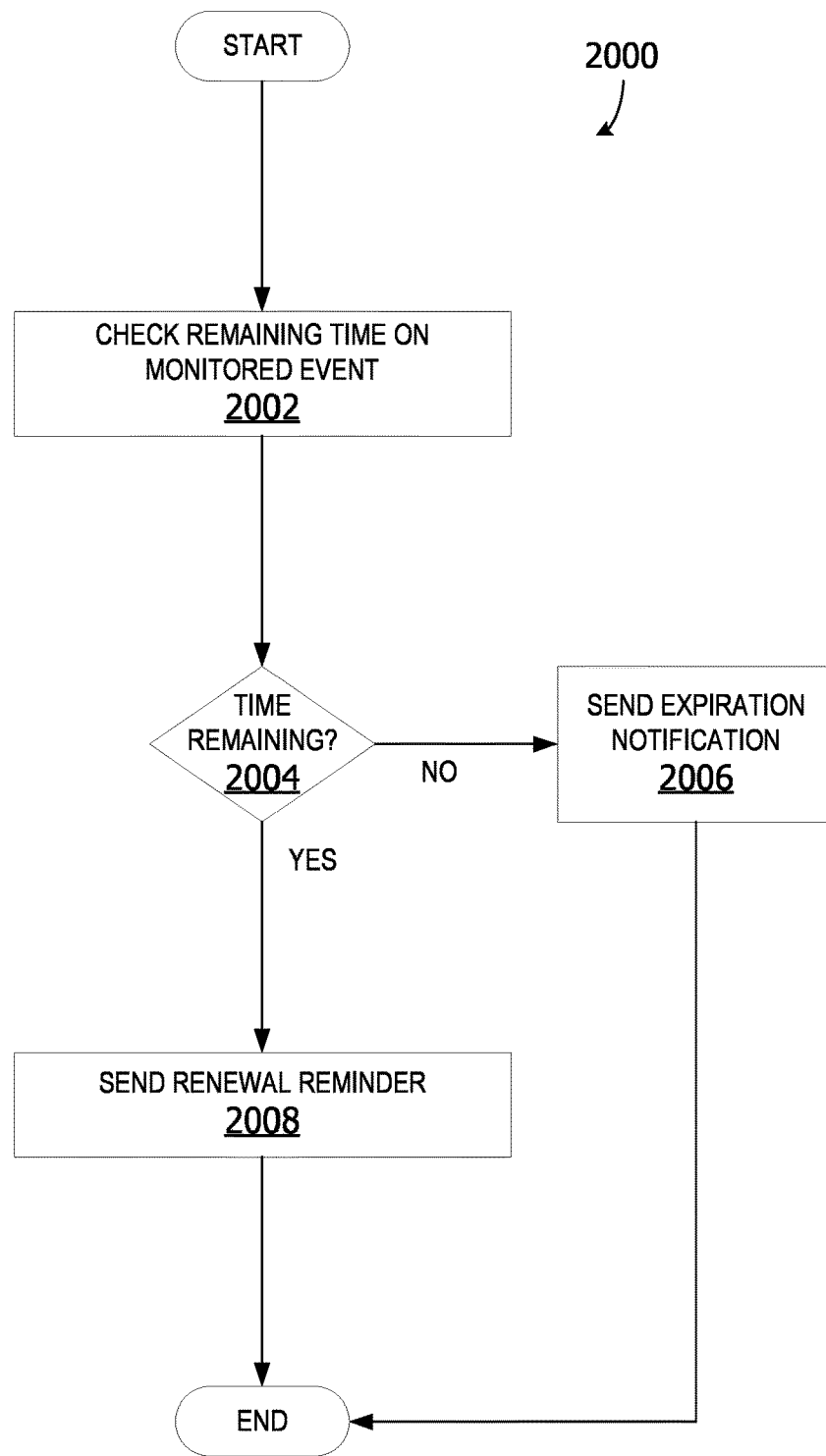
FIG. 20 is an exemplary flow chart illustrating operation of the computing device to generate renewal reminders for monitored events.

FIG. 20 is an exemplary flow chart 2000 illustrating operation of the computing device to generate renewal reminders for monitored events. The process in FIG. 20 is performed by a function manager executing on a computing device, such as, but not limited to, the multicolor light device 102 in FIG. 1 and/or the user device 126 in FIG. 1.

The process begins by checking the time remaining prior to a due date on a monitored event at 2002. The due date can be any type of date, such as, but not limited to, an expiration date, renewal date and/or other event date. The monitored event is any type of user-selected event having a renewal date, expiration date, or other scheduled event date or time-frame, such as, but not limited to, a warranty expiration, a warranty renewal time-period, a license expiration date, a license renewal time-period, a maintenance due date, a recommended maintenance time-period, etc.

The function manager determines how much time is remaining prior to the event date at 2004. The time remaining is calculated based on a current date and the monitored event date. If there is no time remaining prior to the event date, an expiration notification is sent at 2006. In this example, the notification is sent to a user device for display to the user via a user interface. If there is time remaining prior to the expiration or due date (event date), a renewal reminder is sent at 2008. In some examples, additional reminders are sent periodically until the expiration date is reached. The process terminates thereafter.

Referring now to FIG. 21, an exemplary screenshot illustrating a user login screen 2100 is shown. In this example, a user logs into a portal page or other configuration page provided by a manufacturer or other third party managing the locked function licensing. The portal page is provided in this example via a server, such as, but not limited to, a cloud server, a web server, or any other type of server. In some example, the user log-in accepts a user name and password.

In other examples, the log-in is performed using one or more types of biometric data, such as, but not limited to, a fingerprint, facial recognition, etc. In this example, the log-in occurs via a user device connected to the remote computing device (server) via a network connection. Once logged in, the user can access a configuration page (configurator) to select functions for locking and/or unlocking.

In still other examples, the login page includes a "create account" option enabling a user to create a new account. During account creation, the user sets up an account with a user name and password. The user optionally registers one or more multicolor light devices by entering the UID for the device after account creation.

FIG. 22 is an exemplary screenshot illustrating a device status page 2200. In this example, the device status page shows a connected device status indicating whether the multicolor light device is connected to the user device which is logged into the license managing server, such as, but limited to, the cloud server 128 in FIG. 1 and/or the server 212 in FIG. 2. The device status shows a lock status of a selected function and provides an option for the user to unlock one or more additional light colors. The multicolor light device connected to the user device is identified via a unique serial number or other UID. In this non-limiting example, the multicolor light device is connected to the user device via a USB port.

In this example, the serial number is represented as "XXX," where the variable "X" represents an alphanumeric or other value within the device serial number. However, the serial number is not limited to three values. In other examples, the serial number can include any number of values. In still other examples, the serial number is the UID assigned to the device.

FIG. 23 is an exemplary screenshot illustrating a device status page 2300 showing lock status and history data. In this example, the status page indicates the multicolor light device is connected to the user device. If the multicolor light device is not connected, the status page includes a "not connected" or "unconnected device" indication.

In this example, the status page includes a list of available functions and a status indicator showing whether the function is locked or unlocked. However, the examples are not limited to a word indicator that says "locked" or "unlocked." Any type of lock status indicator can be used. For example, the lock status indicator can appear as a check box which is checked or not checked to indicate lock status. In other examples, the lock status can include a color indicator, such as a red color indicator for locked status and a green color indicator for unlocked functions.

In other examples, the status page includes product information, such as, but not limited to, the name or descriptor of the device, type of device, category of the device, etc. The product information also optionally includes a device serial number or UID, production date (manufacture date), installation date, batch identifier, or any other device-related data.

A history log is optionally provided showing historical data associated with the multicolor light device. In some examples, the history log includes date when an activity associated with the device occurred. The activity includes date of licensing a function, installation date when the multicolor light device is installed on a vehicle, manufacture date, maintenance tasks and dates when the maintenance tasks occurred, etc.

FIG. 24 is an exemplary screenshot illustrating a configuration page 2400. The configuration page 2400 in some examples includes an identification of a set of selected colors to be unlocked. In this example, the multicolor light device is a quad color device having four colors. The four colors include red, blue, amber, and white. The selected flash pattern is a flash pattern from a plurality of available flash patterns selected by the user. The demonstration mode is an option to permit the user to see a demonstration of the selected light colors and selected flash pattern prior to paying a license fee to unlock the selected function. The license time is the license time-period for the selected function(s). The amount is the fee to unlock the selected function. If the user chooses to proceed with licensing the selected function, the user can choose a "pay now" button or icon to proceed to a payment page.

FIG. 25 is an exemplary screenshot illustrating a demonstration mode page 2500. The demonstration mode page shows whether the multicolor light device is connected, the selected combination of colors (Amber, white, blue, and red) in the selected flash pattern. If the user chooses to "try now", the multicolor light device flashes the selected combination of colors in the selected flash pattern while the selected function(s) are locked as long as the multicolor light device is still connected to the user device. The demonstration mode cannot perform the demonstration mode if the multicolor light device is not connected to the user device.

FIG. 26 is an exemplary screenshot illustrating a configuration page 2600 for unlocking one or more functions on a multicolor light device. The configuration page in this example presents a license fee amount for unlocking each available color or flash pattern available based on the number of unlocked light colors. This enables the user to quickly and easily view license fees based on configurable light combinations and flash patterns.

Figure 27:
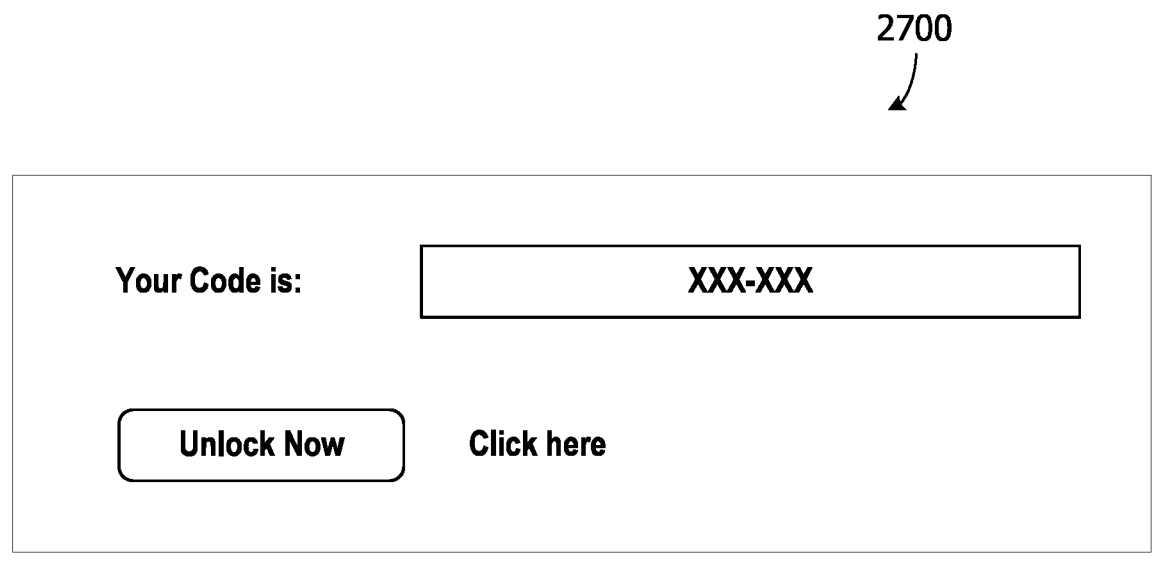

FIG. 27 is an exemplary screenshot illustrating a confirmation page 2700 for completing licensing of a locked function on a multicolor light device. In this non-limiting example, the confirmation page displays the unlock code for the selected function licensed by the user. The unlock code is received from a remote server. The user selects to proceed with unlocking the device. The unlock code enables the unlocked function(s) to operate normally on the multicolor light device for the duration of the licensed term.

Figure 28:
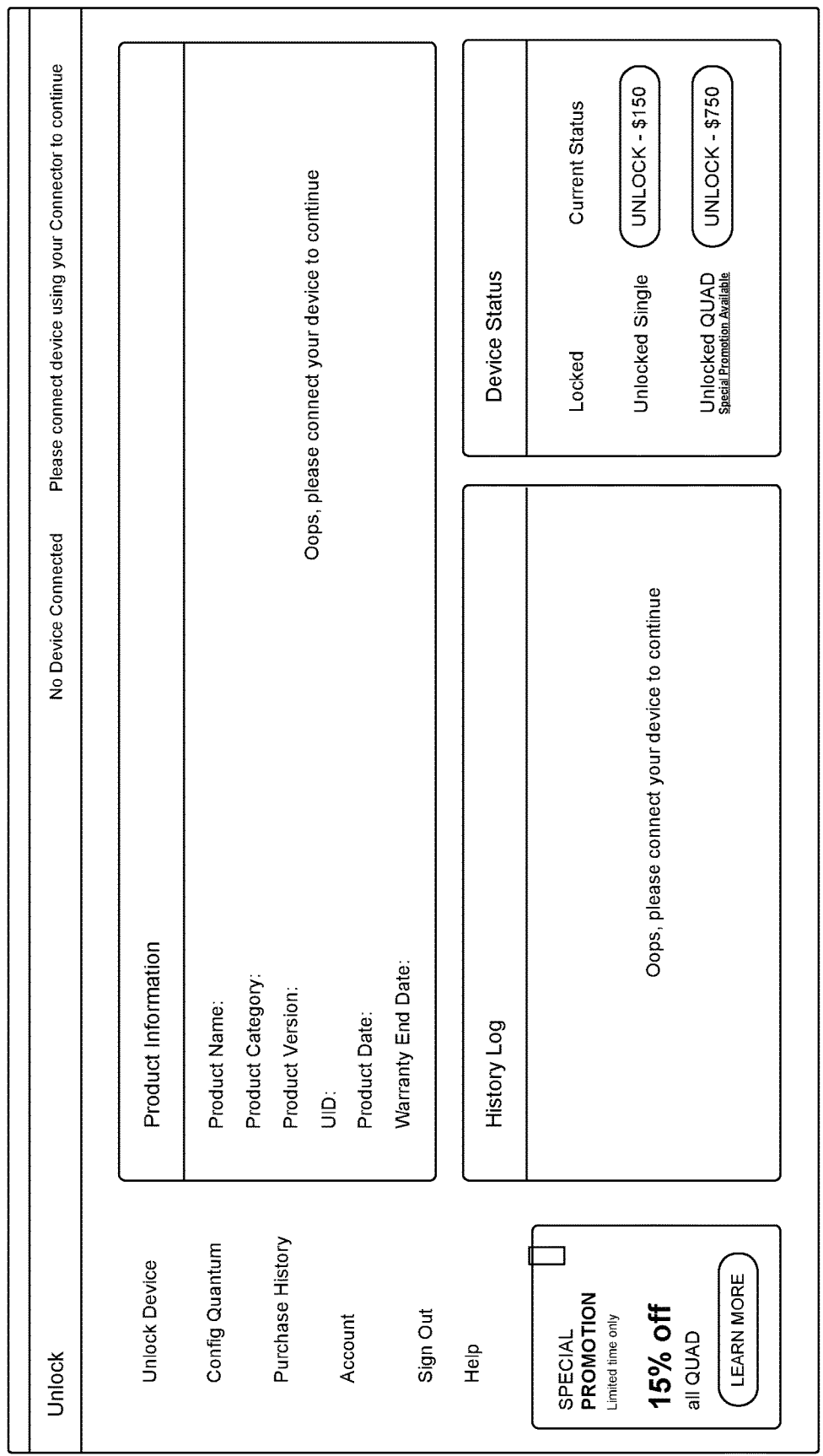
FIG. 28 is an exemplary screenshot illustrating a multicolor light device configuration page enabling user configuration of a set of lockable functions.

FIG. 28 is an exemplary screenshot illustrating a multicolor light device configuration page 2800 enabling user configuration of a set of lockable functions. In this non-limiting example, a user can choose a module, function and/or colors for a specific configuration of functions. The selected configuration of functions can be referred to as a build. The build can be uploaded for licensing or saved for later consideration or review. In some examples, the configuration page includes device description data, such as, but not limited to, descriptive information describing the multicolor light device and/or the UID for the device.

Figure 29:
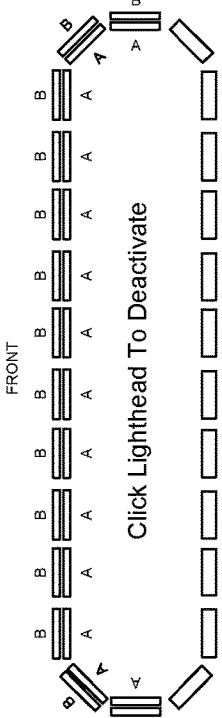
FIG. 29 is an exemplary screenshot illustrating a multicolor light device configuration page enabling selection of functions to create a build.

FIG. 29 is an exemplary screenshot illustrating a multicolor light device configuration page 2900 enabling selection of functions to create a build. In this non-limiting example, the configuration page provides options for user configuration of input, mode, flash pattern and light brightness level. The user can select one or more colors to assign to a given configuration build, in this example.

Figure 30:
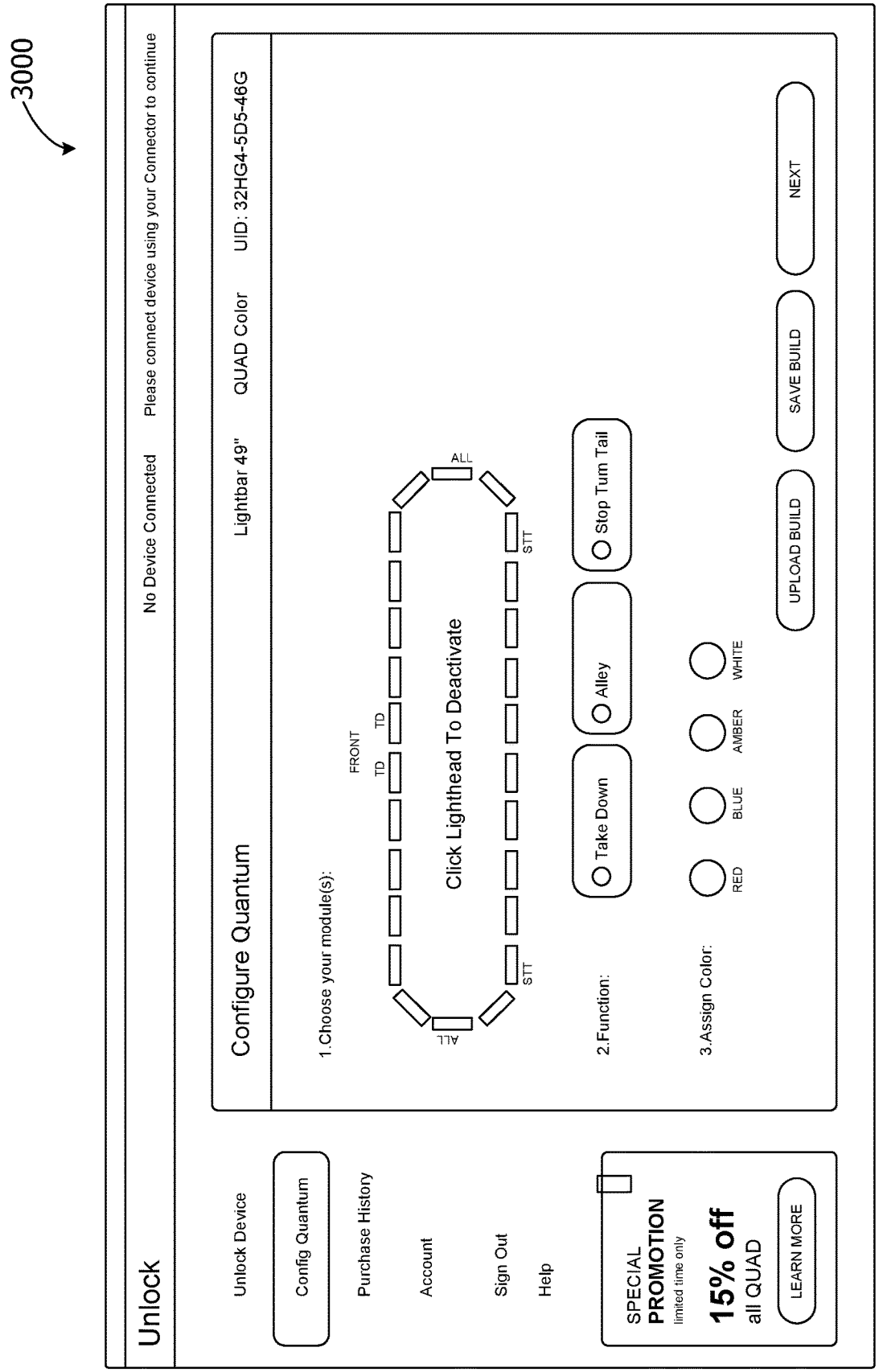
FIG. 30 is an exemplary screenshot illustrating a device configuration page showing device data and cost to unlock single color and quad color functionality.

FIG. 30 is an exemplary screenshot illustrating a device configuration page 3000 showing device data and cost to unlock single color and quad color functionality. The page includes product (device) information, history log for the device and/or device status. The page also optionally includes pricing information for unlocking single color functionality and pricing information for unlocking quad color functionality. In this example, the multicolor light device is not connected to the user device. The page optionally includes an instruction indicating the user should connect the device to the user device via the USB port in order to continue configuration of the device.

Additional Examples

In some examples, a multicolor light device with lockable functions is provided to enable sales of multicolor LED light devices at single-color light device pricing. Customers that want additional functionality connect to a database or remote server to download unlock code(s) enabling additional colors and dual-color, tri-color or quad-color functionality in addition to the basic single-color functions.

In some examples, lockable multicolor light devices are provided to dealers and/or consumers with a single-color unlocked such that the multicolor light device functions as a single-color light device until additional light colors and/or functions are unlocked via a licensing procedure. The multicolor light devices in these examples are sold at single-color light device prices, enabling increased sales volume and greater dealer stock volume where dealers pay less to stock multicolor light devices. Thus, manufacturers can produce more multicolor light devices and store less volume where dealers act as an inventory hub. In addition, fewer item outs are experienced a single type of multicolor light device is capable of functioning as single-color light devices, dual-color light devices, tri-color light devices, quad color light devices, spotlights, and other types of light devices.

In still other examples, the lockable functions enable improved customizable functions to service customers faster. In one example, a user connects a multicolor light device into a user device while logged into a licensing server, such as, but not limited to, the cloud server 128 in FIG. 1 and/or the server 212 in FIG. 2. In this example, the multicolor light bar is plugged into a USB port on the multicolor light device and/or the user device to connect. A UI screen on the user interface indicates whether the device is properly connected. If so, the user is given the option to register/create a login if the user has not previously created an account and/or registered the device. The system presents device data, such as, but not limited to, the device UID or serial number, and status of the device. The status includes a list of functions and lock status of each function. The user can select a locked function for demonstration mode or to unlock (license) the locked function. The user utilizes a payment webpage to purchase a license/unlock code to unlock the selected functions. The status of the newly unlocked functions are updated on the multicolor light device as well as on the remote device management system (cloud server) or a cloud database.

In other examples, the unlock code is provided to the multicolor light device via a dongle or other device that plugs into a port on the multicolor light device. In this example, the unlock code is loaded onto the dongle and then provided to the light device via the USB or other connection port.

The UID is a unique identification assigned to each multicolor light device. The UID, in some examples, is stored in the firmware in EEPROM or flash memory on the device.

The multicolor light device, in another example, includes a time function which enables the device to calculate an amount of time which has passed and/or determine when a license expires. In this example, the multicolor light device remembers a license start date, a license end date, a date of first user, and other information. The multicolor light device checks the current date and calculates whether the license has run out or is about to run out within a predetermined period of time. In some examples, this event monitoring is performed using GPS or an onboard clock crystal real time clock (RTC) module. The RTC is powered with a battery. In other examples, the RTC can be powered via the vehicle electrical system.

In yet other examples, a user device connects to an online server to access a configurator page. The configurator page is used to select functions on the multicolor light device which are to be unlocked. In other words, a configurator page is a webpage which enables the user to customize function configurations of each multicolor light device. This enables the user to configure each device differently for different situations and different types of vehicles. In this manner, the same type of multicolor light bar can be configured to operate as a spotlight, a police car light bar, a fire truck light bar, a tow truck light bar, or any other type of emergency vehicle light. This provides increased flexibility and adaptability of light devices.

In other examples, a remote device manager can initiate a diagnostics process on the multicolor light device via a network connection. In this example, the OBD is initiated remotely to ensure proper functioning of the multicolor light device for improved customer convenience while ensuring optimum device function.

Alternatively, or in addition to the other examples described herein, examples include any combination of the following:
- the multicolor light device is a quad-color light device capable of illuminating four different colors when unlocked, wherein a first color is unlocked at manufacture time, and wherein a first unlock code unlocks a second color, wherein a second unlock code unlocks a third color, and wherein a third unlock code unlocks the fourth color;
- a unique identifier (UID) assigned to the multicolor light device, wherein the UID is mapped to device-specific, function-related data associated with the set of available functions;
- a data storage device associated with the multicolor light device, the data storage device storing the status of the set of available functions, including the selected function, wherein the status of the selected function is updated in response to the multicolor light device receiving the unlock code;
- a plurality of unlock codes associated with a plurality of unlocked functions in the set of available functions, the plurality of unlock codes stored on a data storage device on the multicolor light device, wherein a different unlock code is associated with each unlocked function;
- a timer device associated with the multicolor light device, wherein the timer device monitors an amount of remaining time in the predetermined license time-period;
- a demonstration mode of the multicolor light device, wherein the demonstration mode enables at least one function in the set of available functions to operate in a locked state while the multicolor light device is connected to the user device;
- a diagnostics mode of the multicolor light device, wherein the diagnostics mode performs at least one diagnostic operation on the multicolor light device when activated;
- generate a reminder comprising at least one of a warranty expiration reminder, a storing, on a multicolor light device, a list of available functions associated with a plurality of LED lights on the multicolor light device;
- the plurality of LED lights comprising a first set of LED lights configured to emit a first colored light and a second set of LED lights configured to emit a second colored light, the first colored light being a different color than the second colored light, wherein at least one selected function in the list of available functions is in a locked state;
- receiving, from a user device communicatively coupled to the multicolor light device, an unlock code associated with at least one selected function in the list of available functions, the list of available functions comprising at least one of a combination of colors and at least one flash pattern;
- changing a lock status of the at least one selected function from a locked state to an unlocked state in response to receiving the unlock code, wherein the at least one selected function is inoperable in the locked state, and wherein the at least one selected function is operable in the unlocked state;
- returning the lock status of the at least one selected function from the unlocked state back to the locked state at a termination of a predetermined license time-period;
- wherein the multicolor light device is a quad-color light device capable of illuminating four different colors when unlocked;
- unlocking a first set of functions associated with a first set of LED lights having a first color at manufacture time;
- unlocking a second set of functions associated with a second set of LED lights having a second color in response to receiving a first unlock code;
- unlocking a third set of functions associated with a third set of LED lights having a third color in response to receiving a second unlock code;
- unlocking a fourth set of functions associated with a fourth set of LED lights having a fourth color in response to receiving a third unlock code;
- unlocking a first flash pattern at manufacture time;
- unlocking a second flash pattern in response to receiving a first unlock code;
- unlocking a third flash pattern in response to receiving a second unlock code, wherein the first unlock code is a different code then the second unlock code;
- storing a UID, the list of available functions, and the lock status of each function in the list of available functions on a data storage device associated with the multicolor light device;

monitoring, by a timer device associated with the multicolor light device, an amount of remaining time in the predetermined license time-period, wherein a license renewal reminder is generated within a user-selected time-period prior to a license expiration date at an end of the predetermined license time-period;

enabling, during a demonstration mode of the multicolor light device, a locked function to operate in a locked state while the multicolor light device is connected to the user device;

performing a set of diagnostic tests associated with at least one function of the multicolor light device;

sending the reminder to the user device for viewing by at least one user, the reminder comprising at least one of a warranty expiration reminder, a maintenance due reminder and a license renewal reminder;

a plurality of LED lights capable of emitting light in a plurality of available colors, the plurality of LED lights comprising a first set of LED lights configured to emit a first colored light and a second set of LED lights configured to emit a second colored light, the first colored light being a different color than the second colored light;

a data storage device storing an assigned UID, a set of available functions associated with the plurality of LED lights, and a status of each function in the set of available functions, at least one selected function in the set of available functions in a locked state preventing operation of the at least one function;

universal serial bus (USB) port that communicatively couples to a user device to obtain an unlock code associated with the at least one selected function that is in a locked state, the at least one selected function comprising at least one of combination of colors and a flash pattern;

a processor communicatively coupled to a memory of the multicolor light device, the memory having stored thereon computer-executable instructions causing the processor to update a lock status of the at least one selected function in the data storage from the locked state to an unlocked state in response to receiving the unlock code, wherein the at least one selected function is inoperable in the locked state, and wherein the at least one selected function is operable in the unlocked state;

a demonstration mode of the multicolor light device, wherein the demonstration mode enables a selected function to operate while in a locked state to demonstrate normal operation of the selected function to a user prior to completing a licensing process to unlock the selected function while the multicolor light device is connected to the user device;

unlock a first set of functions associated with a first set of LED lights having a first color at an initialization time;

unlock a second set of functions associated with a second set of LED lights having a second color in response to receiving a first unlock code;

unlock a third set of functions associated with a third set of LED lights having a third color in response to receiving a second unlock code; and unlock a fourth set of functions associated with a fourth set of LED lights having a fourth color in response to receiving a third unlock code.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

In some examples, the operations illustrated in FIG. 16, FIG. 17, FIG. 18, FIG. 19, and FIG. 20 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of locking functions on a multicolor light device. The method includes storing, on a multicolor light device, a list of available functions associated with a plurality of light emitting diode (LED) lights on the multicolor light device; receiving, from a user device communicatively coupled to the multicolor light device, an unlock code associated with at least one selected function in the list of available functions; changing a lock status of the at least one selected function from a locked state to an unlocked state in response to receiving the unlock code; and permitting the selected function to operate normally in the unlocked state.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing lockable multicolor light device functions. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, such as when encoded to perform the operations illustrated in FIG. 16, FIG. 17, FIG. 18, FIG. 19 and FIG. 20, constitute exemplary means for storing, on a multicolor light device, a list of available functions associated with a plurality of light emitting diode (LED) lights on the multicolor light device; exemplary means for receiving an unlock code associated with at least one selected function in the list of available functions; changing a lock status of the at least one selected function from a locked state to an unlocked state in response to receiving the unlock code; and exemplary means for returning the lock status of the at least one selected function from the unlocked state back to the locked state at a termination of a predetermined license time-period.

Other non-limiting examples provide one or more computer storage devices having a first computer-executable instructions stored thereon for providing a lockable multicolor light device. When executed by a computer, the computer performs operations including storing, on a multicolor light device, a list of available functions associated with a plurality of LED lights on the multicolor light device; receiving, from a user device communicatively coupled to the multicolor light device, an unlock code associated with at least one selected function in the list of available functions; unlocking the selected function; permitting the selected function to operate normally; changing a lock status of the at least one selected function from a locked state to an unlocked state in response to receiving the unlock code; and returning the lock status of the at least one selected function from the unlocked state back to the locked state at a termination of a predetermined license time-period.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of", or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for lockable multicolor light device functions, the system comprising:
    a multicolor light device comprising a plurality of light emitting diode (LED) lights, the plurality of LED lights comprising a first LED light that emits a first colored light and a second LED light that emits a second colored light, the first colored light being a different color than the second colored light;
    a data storage device stores a set of available functions associated with the plurality of LED lights and a lock status of each function in the set of available functions, the set of available functions comprising at least one of a combination of colors function and at least one flash pattern function, the lock status comprising an unlock state or a locked state, the locked state associated with a selected function in the set of available functions indicating the selected function is prevented from operating without an unlock code;
    a communications interface device of the multicolor light device receives the unlock code associated with the selected function from a user device or a device management server via a wired network connection or a wireless network connection; and
    a processor communicatively coupled to a memory of the multicolor light device, the memory having stored thereon computer-executable instructions causing the processor to change the lock status of the selected function of the multicolor light device from the lock state to the unlocked state in response to receiving the unlock code, wherein the selected function of the multicolor light device operates normally in the unlocked state.

2. The system of claim 1, wherein the multicolor light device is a quad-color light device for illuminating four different colors when unlocked, wherein a first color is unlocked at manufacture time, and wherein a first unlock code unlocks a second color, wherein a second unlock code unlocks a third color, and wherein a third unlock code unlocks a fourth color.

3. The system of claim 1, further comprising:
    a unique identifier (UID) assigned to the multicolor light device, wherein the UID is mapped to device-specific, function-related data associated with the set of available functions.

4. The system of claim 1, wherein the user device displays the status of the set of available functions via a user interface, including the selected function, wherein the status of the selected function is updated in response to the multicolor light device receiving the unlock code.

5. The system of claim 1, further comprising:
    a plurality of unlock codes associated with a plurality of unlocked functions in the set of available functions, the plurality of unlock codes stored on the data storage device on the multicolor light device, wherein a different unlock code is associated with each unlocked function.

6. The system of claim 1, further comprising:
    a timer device associated with the multicolor light device, wherein the timer device monitors an amount of remaining time in a predetermined license time-period.

7. The system of claim 1, further comprising:
    a demonstration mode of the multicolor light device, wherein the demonstration mode enables at least one function in the set of available functions to operate in a locked state while the multicolor light device is connected to the user device.

8. The system of claim 1, further comprising:
    a diagnostics mode of the multicolor light device, wherein the diagnostics mode performs at least one diagnostic operation on the multicolor light device when activated.

9. The system of claim 1, wherein the computer-executable instructions are further executed to cause the processor to generate a reminder comprising at least one of a warranty expiration reminder, a maintenance due reminder and a license renewal reminder.

10. A method for managing lockable functions on a multicolor light device, the method comprising:
    storing, on a multicolor light device, a list of available functions associated with a plurality of light emitting diode (LED) lights on the multicolor light device, the plurality of LED lights comprising a first set of LED lights for emitting a first colored light and a second set of LED lights for emitting a second colored light, the first colored light being a different color than the second colored light, wherein at least one selected function in the list of available functions is in a locked state;
    receiving, from a user device communicatively coupled to the multicolor light device via a wired network connection or a wireless network connection, an unlock code associated with at least one selected function in the list of available functions that is in a locked state, the list of available functions comprising at least one of a combination of colors and at least one flash pattern;
    changing a lock status of the at least one selected function from a locked state to an unlocked state in response to receiving the unlock code, wherein the at least one selected function is inoperable in the locked state, and wherein the at least one selected function is operable in the unlocked state; and permitting the selected function to operate normally in the unlocked state.

11. The method of claim 10, wherein the multicolor light device is a quad-color light device for illuminating four different colors when unlocked, and further comprising:
unlocking a first set of functions associated with a first set of LED lights having a first color at manufacture time;
unlocking a second set of functions associated with a second set of LED lights having a second color in response to receiving a first unlock code;
unlocking a third set of functions associated with a third set of LED lights having a third color in response to receiving a second unlock code; and
unlocking a fourth set of functions associated with a fourth set of LED lights having a fourth color in response to receiving a third unlock code.

12. The method of claim 10, further comprising:
unlocking a first flash pattern at manufacture time;
unlocking a second flash pattern in response to receiving a first unlock code; and
unlocking a third flash pattern in response to receiving a second unlock code, wherein the first unlock code is a different code then the second unlock code.

13. The method of claim 10, further comprising:
returning the lock status of the at least one selected function from the unlocked state back to the locked state at a termination of a predetermined license time-period.

14. The method of claim 10, further comprising:
monitoring, by a timer device associated with the multicolor light device, an amount of remaining time in a predetermined license time-period, wherein a license renewal reminder is generated within a user-selected time-period prior to a license expiration date at an end of the predetermined license time-period.

15. The method of claim 10, further comprising:
enabling, during a demonstration mode of the multicolor light device, a locked function to operate in a locked state while the multicolor light device is connected to the user device.

16. The method of claim 10, further comprising:
performing a set of diagnostic tests associated with at least one function of the multicolor light device.

17. The method of claim 10, further comprising:
generating a reminder; and
sending the reminder to the user device for viewing by at least one user, the reminder comprising at least one of a warranty expiration reminder, a maintenance due reminder and a license renewal reminder.

18. A multicolor light device having lockable functions, the multicolor light device comprising:
a plurality of LED lights for emitting light in a plurality of available colors, the plurality of LED lights comprising a first set of LED lights for emitting a first colored light and a second set of LED lights for emitting a second colored light, the first colored light being a different color than the second colored light;
a data storage device storing an assigned unique identifier UID, a set of available functions associated with the plurality of LED lights, and a status of each function in the set of available functions, at least one selected function in the set of available functions in a locked state preventing operation of the at least one selected function;
a communications interface device of the multicolor light device that receives an unlock code associated with at least one selected function that is in a locked state via a wired network connection or a wireless network connection to a user device or a device management server;
a universal serial bus (USB) port that communicatively couples to the user device to obtain the unlock code associated with the at least one selected function that is in the locked state via the wired network connection to the USB port, the at least one selected function comprising at least one of a combination of colors and a flash pattern; and
a processor communicatively coupled to a memory of the multicolor light device, the memory having stored thereon computer-executable instructions causing the processor to update a lock status of the at least one selected function in the data storage from the locked state to an unlocked state in response to receiving the unlock code, wherein the at least one selected function is inoperable in the locked state, and wherein the at least one selected function is operable in the unlocked state.

19. The multicolor light device of claim 18, further comprising:
a demonstration mode of the multicolor light device, wherein the demonstration mode enables a selected function to operate while in a locked state to demonstrate normal operation of the selected function to a user prior to completing a licensing process to unlock the selected function while the multicolor light device is connected to the user device.

20. The multicolor light device of claim 18, wherein the computer-executable instructions further cause the processor to:
unlock a first set of functions associated with a first set of LED lights having a first color at an initialization time;
unlock a second set of functions associated with a second set of LED lights having a second color in response to receiving a first unlock code;
unlock a third set of functions associated with a third set of LED lights having a third color in response to receiving a second unlock code; and
unlock a fourth set of functions associated with a fourth set of LED lights having a fourth color in response to receiving a third unlock code.

* * * * *